US008823202B2

(12) United States Patent
Sugita

(10) Patent No.: US 8,823,202 B2
(45) Date of Patent: Sep. 2, 2014

(54) ELECTRONIC APPLIANCE

(75) Inventor: Takehiro Sugita, Kanagawa (JP)

(73) Assignee: Sony Corporation (JP)

( * ) Notice: Subject to any disclaimer, the term of this patent is extended or adjusted under 35 U.S.C. 154(b) by 538 days.

(21) Appl. No.: 13/173,326

(22) Filed: Jun. 30, 2011

(65) Prior Publication Data

US 2012/0008263 A1       Jan. 12, 2012

(30) Foreign Application Priority Data

Jul. 8, 2010    (JP) ................................ P2010-155624

(51) Int. Cl.
*H02J 3/02*         (2006.01)
*H02J 3/34*         (2006.01)
*H04B 3/54*         (2006.01)

(52) U.S. Cl.
USPC ........................................ 307/3; 307/1; 307/4

(58) Field of Classification Search
USPC ..................................................... 307/1, 3, 4
See application file for complete search history.

(56) References Cited

U.S. PATENT DOCUMENTS 7,751,860 B2    7/2010    Symons et al.
8,306,583 B2 *  11/2012   Symons et al. ............ 455/575.3

FOREIGN PATENT DOCUMENTS

JP        2007-526555 A       9/2007

* cited by examiner

*Primary Examiner* — Hal Kaplan
(74) *Attorney, Agent, or Firm* — Lerner, David, Littenberg, Krumholz & Mentlik, LLP

(57) ABSTRACT

There is provided an electronic appliance including a hinge portion including a first rotating hinge including a first electrode for transmitting a direct current and a first coil for transmitting/receiving a data signal by using electromagnetic induction, and a second rotating hinge including a second electrode for receiving the direct current by contacting the first electrode and a second coil for transmitting/receiving the data signal to/from the first coil. The hinge portion connects the first rotating hinge and the second rotating hinge in a rotatable manner while maintaining a state where the first electrode and the second electrode are in contact with each other and a center axis of the first coil and a center axis of the second coil are substantially same.

6 Claims, 16 Drawing Sheets

ELECTRONIC APPLIANCE

CROSS-REFERENCE TO RELATED APPLICATION

The present application claims priority from Japanese Patent Application No. JP 2010-155624 filed in the Japanese Patent Office on Jul. 8, 2010, the entire content of which is incorporated herein by reference.

BACKGROUND OF THE INVENTION

The present disclosure contains subject matter related to that disclosed in Japanese Priority Patent Application JP 2010-155624 filed in the Japan Patent Office on Jul. 8, 2010, the entire contents of which are hereby incorporated by reference.

Many portable appliances such as mobile phones and notebook PCs are configured from a main body equipped with operation means to be operated by a user and a display portion equipped with a display device such as an LCD (Liquid Crystal Display). Also, a movable member is used for a hinge portion connecting the main body and the display portion. Normally, power lines and signal lines pass through this hinge portion. Thus, lines passing through the hinge portion are deteriorated according to transformation of the hinge portion. Accordingly, a refinement for preventing deterioration in the lines passing through the hinge portion occurring at the time of transformation of the hinge portion is desired.

To suppress deterioration occurring in the lines passing through the hinge portion, first, it is important to reduce the number of the lines passing through the hinge portion. Until now, a parallel transmission scheme was used in many cases for data transmission from the main body to the display portion. In the case of adopting the parallel transmission scheme, several tens of signal lines are to pass through the hinge portion to transmit image data to be displayed on the display device. Thus, there were risks that signal lines would be twisted due to the transformation of the hinge portion, and that the power lines and the signal lines would break. Accordingly, as a data transmission scheme for replacing the parallel transmission scheme, a serial transmission scheme capable of transmitting the image data by about one line was devised.

Furthermore, JP 2007-526555T discloses a method of wirelessly transmitting image data and power from the main body to the display portion without providing a line in the hinge portion. Particularly, the patent document discloses a method of transmitting a data signal from the main body to the display portion by contactless communication that uses capacitive coupling between electrodes provided in the hinge portion. Furthermore, the patent document discloses a method of extracting power by rectifying the data signal which has been transmitted using the capacitive coupling between the electrodes. As described, by applying the method of the patent document, image data and power can be transmitted from the main body to the display portion without providing a line in the hinge portion.

SUMMARY OF THE INVENTION

As described above, by reducing the number of lines passing through the hinge portion as much as possible or by getting rid of the lines altogether, breakdown due to breaking of power lines or signal lines can be avoided. Furthermore, the degree of freedom of the hinge portion's transformation is increased, thereby improving the design of a portable appliance. Incidentally, in recent years, the resolution of the LCD is increased, and high transmission rate is desired for the data transmission of image data. Accordingly, when transmitting image data from the main body to the display portion, it is necessary to transmit a data signal that is synchronized with a high-frequency clock. The patent document described above discloses a method of extracting power by rectifying a data signal, but it is difficult to extract enough power from a data signal of high frequency using this method.

In light of the foregoing, it is desirable to provide an electronic appliance which is novel and improved, and which is capable of easily realizing high-speed data transmission and transmission of enough power while maintaining stability of data transmission and power transmission in a hinge portion.

According to an embodiment of the present disclosure, there is provided an electronic appliance which includes a hinge portion including a first rotating hinge including a first electrode for transmitting a direct current and a first coil for transmitting/receiving a data signal by using electromagnetic induction, and a second rotating hinge including a second electrode for receiving the direct current by contacting the first electrode and a second coil for transmitting/receiving the data signal to/from the first coil. The hinge portion connects the first rotating hinge and the second rotating hinge in a rotatable manner while maintaining a state where the first electrode and the second electrode are in contact with each other and a centre axis of the first coil and a centre axis of the second coil are substantially same.

According to another embodiment of the present disclosure, there is provided an electronic appliance which includes a hinge portion including a first rotating hinge including a first coil for transmitting power by using electromagnetic induction and a first electrode for transmitting/receiving a data signal by using capacitive coupling, and a second rotating hinge including a second coil for receiving the power transmitted from the first coil and a second electrode for transmitting/receiving the data signal to/from the first electrode. The hinge portion connects the first rotating hinge and the second rotating hinge in a rotatable manner while maintaining a state where a centre axis of the first coil and a centre axis of the second coil are substantially same and the first electrode and the second electrode are substantially parallelly separated at a predetermined distance.

According to another embodiment of the present disclosure, there is provided an electronic appliance which includes a hinge portion including a first rotating hinge including a first coil for transmitting power by using electromagnetic induction and a second coil for transmitting/receiving a data signal by using electromagnetic induction, and a second rotating hinge including a third coil for receiving the power transmitted from the first coil and a fourth coil for transmitting/receiving the data signal to/from the second coil. The hinge portion connects the first rotating hinge and the second rotating hinge in a rotatable manner while maintaining a state where a centre axis of the first coil and a centre axis of the third coil are substantially same and a centre axis of the second coil and a centre axis of the fourth coil are substantially same.

A first frequency of AC current applied to the first and third coils may be lower than a second frequency of AC current applied to the second and fourth coils.

According to another embodiment of the present disclosure, there is provided an electronic appliance which includes a hinge portion including a first rotating hinge including a first electrode for transmitting power by using capacitive coupling and a second electrode for transmitting/receiving a data signal by using capacitive coupling, and a second rotating hinge including a third electrode for receiving the power transmitted from the first electrode and a fourth electrode for transmitting/receiving the data signal to/from the second electrode. The hinge portion connects the first rotating hinge and the second rotating hinge in a rotatable manner while maintaining the first electrode and the third electrode substantially parallelly separated at a predetermined distance and the second electrode and the fourth electrode substantially parallelly separated at a predetermined distance.

The first rotating hinge may include a cylindrical convex portion. The second rotating hinge may include a tubular concave portion to which the cylindrical convex portion of the first rotating hinge is fitted. The convex portion of the first rotating hinge may have a centre axis that is substantially same as with the concave portion of the second rotating hinge. The first rotating hinge may have a structure capable of rotating with a centre axis of the convex portion of the first rotating hinge as a rotation axis in a state where the convex portion of the first rotating hinge and the concave portion of the second rotating hinge are fitted together.

According to the embodiments of the present disclosure described above, it is possible to easily realize high-speed data transmission and transmission of enough power which maintaining stability of data transmission and power transmission in a hinge portion.

DETAILED DESCRIPTION OF THE EMBODIMENT(S)

Figure 1:
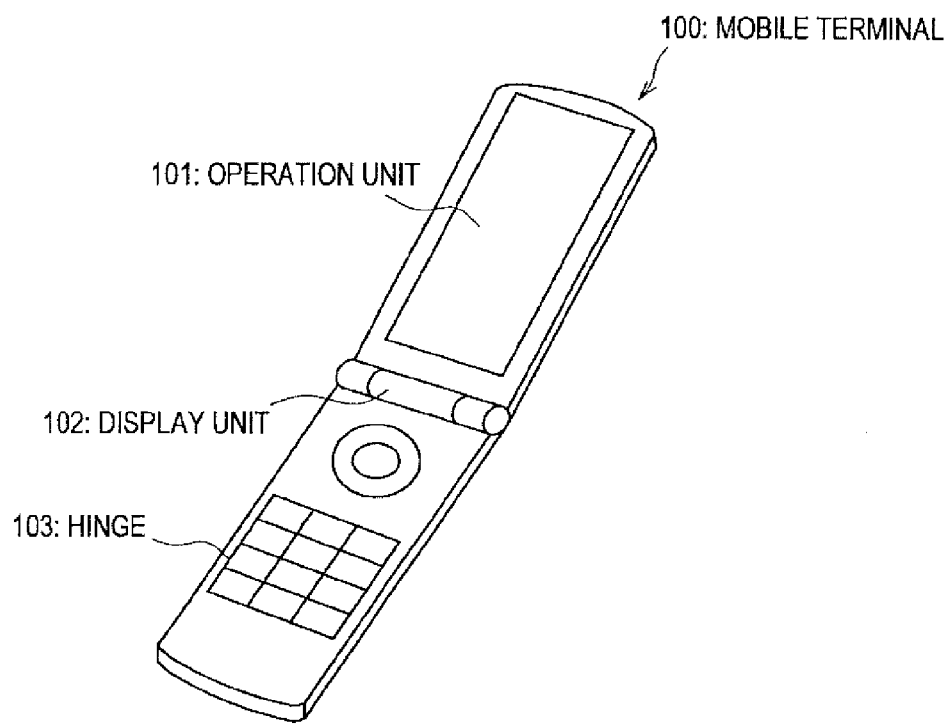
FIG. 1 is an explanatory diagram for describing a configuration of a general folding mobile terminal.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[Flow of Explanation]

The flow of explanation on an embodiment of the present disclosure which will be described below will be briefly stated here. First, a configuration of a foldable mobile terminal 100 will be described with reference to FIG. 1. Then, an example of an arrangement of lines passing through a hinge 103 of the mobile terminal 100 (a general line arrangement) will be described with reference to FIG. 2. Then, a rough functional configuration of the mobile terminal 100 will be described with reference to FIG. 3. Then, a functional configuration related to data transmission in the mobile terminal 100 will be described with reference to FIGS. 4 and 5. Furthermore, a frequency spectrum of a data signal passing through the hinge 103 of the mobile terminal 100 will be described with reference to FIG. 6. Then, a configuration of a circuit for superimposing DC power on a data signal or separating a data signal and DC power from a signal on which the data signal and the DC power are superimposed will be described with reference to FIGS. 7 and 8.

Next, a configuration (example configuration 1) of a hinge portion of the mobile terminal 100 according to a first embodiment of the present disclosure will be described with reference to FIGS. 9A and 9B. Then, another configuration (example configuration 2) of the hinge portion of the mobile terminal 100 according to the embodiment will be described with reference to FIG. 10. Then, a functional configuration related to data transmission and power transmission in the mobile terminal 100 according to the embodiment will be described with reference to FIG. 11.

Next, a configuration (example configuration 1) of a hinge portion of a mobile terminal 100 according to a second embodiment of the present disclosure will be described with reference to FIGS. 12 and 13. Then, another configuration (example configuration 2) of the hinge portion of the mobile terminal 100 according to the embodiment will be described with reference to FIG. 14. Then, a functional configuration related to data transmission and power transmission in the mobile terminal 100 according to the embodiment will be described with reference to FIG. 15.

Next, a configuration (example configuration 1) of a hinge portion of a mobile terminal 100 according to a third embodiment of the present disclosure will be described with reference to FIG. 16. Then, a configuration (example configuration 1) of the hinge portion of the mobile terminal 100 according to the embodiment will be described with reference to FIG. 17. Then, a functional configuration of the mobile terminal 100 according to the embodiment will be described with reference to FIG. 18.

Then, a configuration (example configuration 1) of a hinge portion of a mobile terminal 100 according to a fourth embodiment of the present disclosure will be described with reference to FIG. 19. Then, a configuration (example configuration 2) of the hinge portion of the mobile terminal 100 according to the embodiment will be described with reference to FIG. 20. Lastly, technical ideas of the embodiment of the present disclosure will be summarized and effects obtained by the technical ideas will be briefly described.

(Description Items)
1: Introduction
1-1: Parallel Transmission Scheme
1-2: Serial Transmission Scheme
2: First Embodiment (Data: Electromagnetic Coupling; Power: Electromagnetic Coupling)
2-1: Mechanism of Data Transmission That Uses Electromagnetic Coupling
2-2: Example Configuration 1
2-3: Example Configuration 2
2-4: Functional Configuration Related to Data Transmission and Power Transmission
3: Second Embodiment (Data: Capacitive Coupling; Power: Electromagnetic Coupling)
3-1: Mechanism of Data Transmission That Uses Capacitive Coupling
3-2: Example Configuration 1
3-3: Example Configuration 2
3-4: Functional Configuration Related to Data Transmission and Power Transmission
4: Third Embodiment (Data: Capacitive Coupling; Power: Capacitive Coupling)
4-1: Example Configuration 1
4-2: Functional Configuration Related to Data Transmission and Power Transmission
5: Fourth Embodiment (Data: Contactless; Power: Contact)
5-1: Example Configuration 1
5-2: Example Configuration 2
6: Summary 1: Introduction Before describing an embodiment of the present disclosure, a mechanism of general data transmission adopted in a hinge portion of a folding mobile phone or the like will be briefly described.

[1-1: Parallel Transmission Scheme]

As shown in FIG. 1, a mobile terminal 100 such as a folding mobile phone or the like is configured from an operation unit 101, a display unit 102, and a hinge 103. Furthermore, the operation unit 101 and the display unit 102 are connected by the hinge 103. The hinge 103 is formed from a movable member. Accordingly, the mobile terminal 100 can be folded in such a way that the operation surface of the operation unit 101 and the display screen of the display unit 102 face each other.

Figure 2:
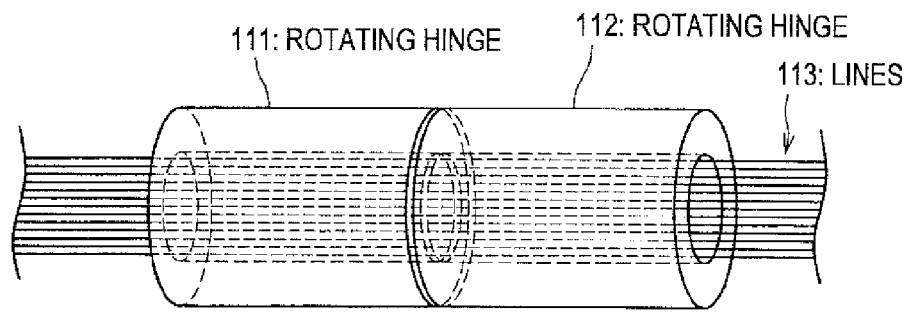
FIG. 2 is an arrangement of lines passing through a hinge portion of a general folding mobile terminal.

For example, the hinge 103 is formed by combining tubular rotating hinges 111 and 112 as shown in FIG. 2, and has a structure allowing rotation around centre axes of the rotating hinges 111 and 112. Furthermore, as shown in FIG. 2, a large number of lines 113 pass through the hinge 103. These lines 113 are means for transmitting data or power from the operation unit 101 to the display unit 102. Additionally, a micro coaxial bundle, a flexible substrate or the like is used as the lines 113, for example.

Figure 3:
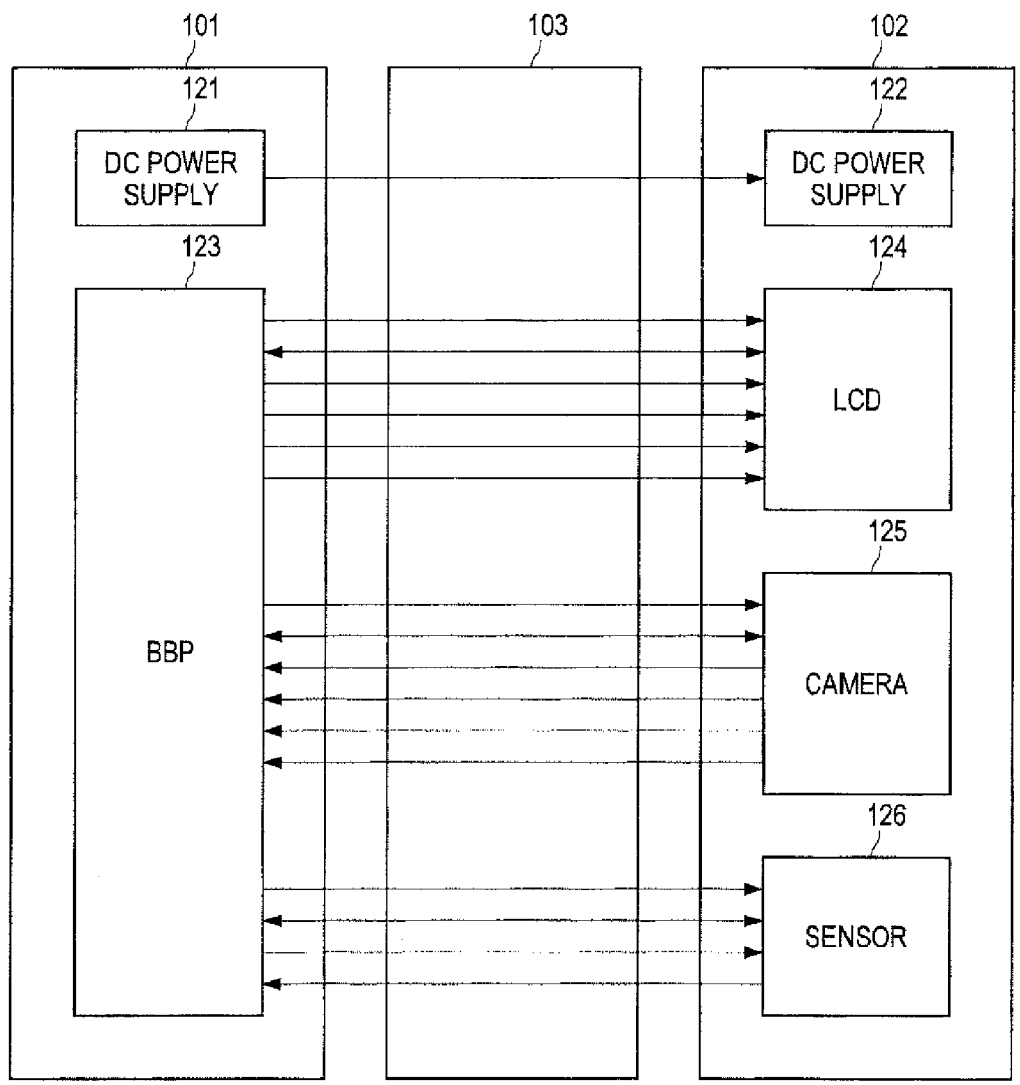
FIG. 3 is an explanatory diagram for describing a rough functional configuration of a general mobile terminal.

Furthermore, as shown in FIG. 3, a DC power supply 121, a BBP 123 (baseband processor) and the like are provided in the operation unit 101. The DC power supply 121 is means for supplying driving power to each structural element of the mobile terminal 100. Furthermore, the BBP 123 is an arithmetic processing apparatus for processing various types of data. For its part, the display unit 102 is provided with a DC power supply 122, an LCD 124, a camera 125, a sensor or the like 126 (hereinafter, referred to as "the sensor 126") and the like. The DC power supply 122 is means for supplying driving power to each structural element of the display unit 102. The LCD 124 is an example of display means for displaying image data. Furthermore, the camera 125 is an example of image capturing means. The sensor 126 is means for acquiring sensor data related to motion or environment, such as a motion sensor, a GPS, a temperature sensor or the like, for example.

As described, a large number of structural elements are provided in the operation unit 101 and the display unit 102. Accordingly, various types of data are exchanged between the operation unit 101 and the display unit 102. Furthermore, power is supplied from the DC power supply 121 of the operation unit 101 to the DC power supply 122 of the display unit 102. For this purpose, a large number of lines 113 pass through the hinge 103 as shown in FIGS. 2 and 3. For example, image data output from the BBP 123 is transmitted to the LCD 124 through the lines 113. Furthermore, captured image data captured by the camera 125 is transmitted to the BBP 123 through the lines 113. Similarly, sensor data acquired by the sensor 126 is transmitted to the BBP 123 through the lines 113. Furthermore, various types of control data are exchanged through the lines 113.

Exchange performed through the lines 113 may be unidirectional or bidirectional. Furthermore, generally, it is said that there are around 20 to 40 lines 113 between the operation unit 101 and the display unit 102. Particularly, in recent years, the resolution of the LCD 124 is increasing and the amount of image data transmitted from the BBP 123 to the LCD 124 is increasing, and the number of lines 113 is also on an increasing trend. Thus, the inner diameter of the hinge 103 becomes large, thereby impairing the design of the mobile terminal 100. Furthermore, there is an apprehension that the lines 113 will break when the lines 113 are bent or twisted at the time of transformation of the hinge 103.

For the above reason, there is a shift in the technology from a scheme for transmitting a large pieces of data in parallel by using a large number of lines 113 (hereinafter, parallel transmission scheme) to a scheme of transmitting data or DC power with a smaller number of lines 113 (for example, serial transmission scheme described later or the like). When the number of lines 113 is reduced, the inner diameter of the hinge 103 can be made smaller and the design of the mobile terminal 100 can be easily improved. Furthermore, the risk of the lines 113 breaking due to bending or twisting of the lines 113 caused by transformation of the hinge 103 is reduced.

[1-2: Serial Transmission Scheme]

In the case of a mobile terminal 100 adopting the serial transmission scheme, a serialiser for converting parallel data output in parallel from the BBP 123 into serial data is provided in the operation unit 101. This serialiser is means for serializing a plurality of data strings input in parallel and converting the same into a serial data string (serial data). In the case of the serial transmission scheme, the data strings are converted into serial data and then transmitted. Thus, it becomes possible to transmit data by one or several lines 113. For its part, the display unit 102 is provided with a deserializer for restoring the parallel data from the serial data received from the operation unit 101. This deserialiser is means for parallelizing the serial data string into the original plurality of data strings.

In the case of the mobile terminal 100 adopting the serial transmission scheme, image data output from the BBP 123 is converted into serial data by the serialiser and is transmitted to the display unit 102, for example. At the display unit 102, the serial data received from the operation unit 101 is parallelized by the deserialiser and the original image data is restored. Then, the restored image data is input to the LCD 124. Additionally, data may also be transmitted from the display unit 102 to the operation unit 101. Accordingly, the serialiser and the deserialiser are in many cases provided in both the operation unit 101 and the display unit 102. Data transmitted from the display unit 102 to the operation unit 101 is also transmitted after being serialized. Such a mechanism for data transmission is realized by the functional configurations of the mobile terminal 100 as shown in FIGS. 4 and 5, for example.

(Specific Functional Configuration)

The functional configuration of the mobile terminal 100 adopting the serial transmission scheme will be described here in greater detail with reference to FIGS. 4 and 5. It should be noted that, for the sake of explanation, only the main functional configuration related to transmission of data and DC power are shown in FIGS. 4 and 5. Furthermore, a scheme of superimposing DC power on a data signal before transmission is introduced here. Additionally, the difference between FIG. 4 and FIG. 5 lies mainly in the difference between transmission means. Whereas the mobile terminal 100 shown in FIG. 4 transmits data and DC power by using one coaxial cable, the mobile terminal 100 shown in FIG. 5 transmits data and DC power by using one differential cable.

Figure 4:
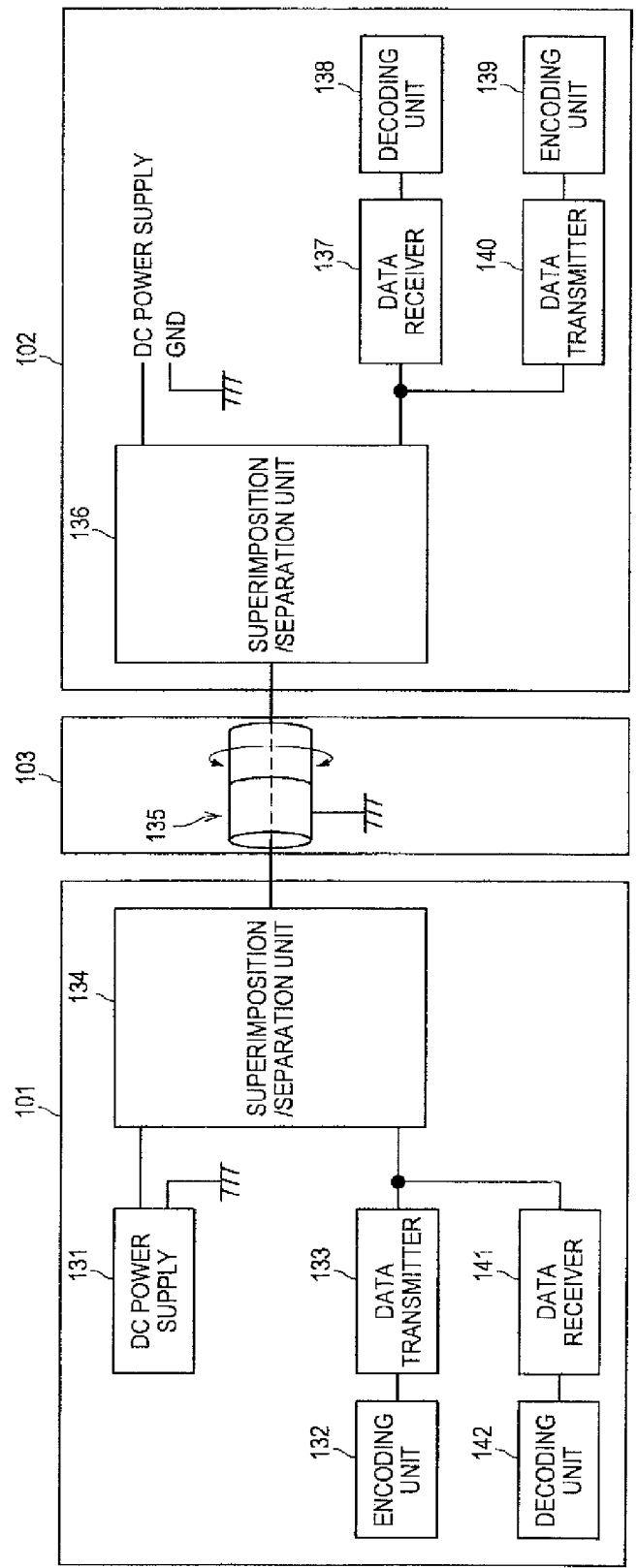
FIG. 4 is an explanatory diagram for describing a functional configuration of a mobile terminal related to data transmission.
Figure 5:
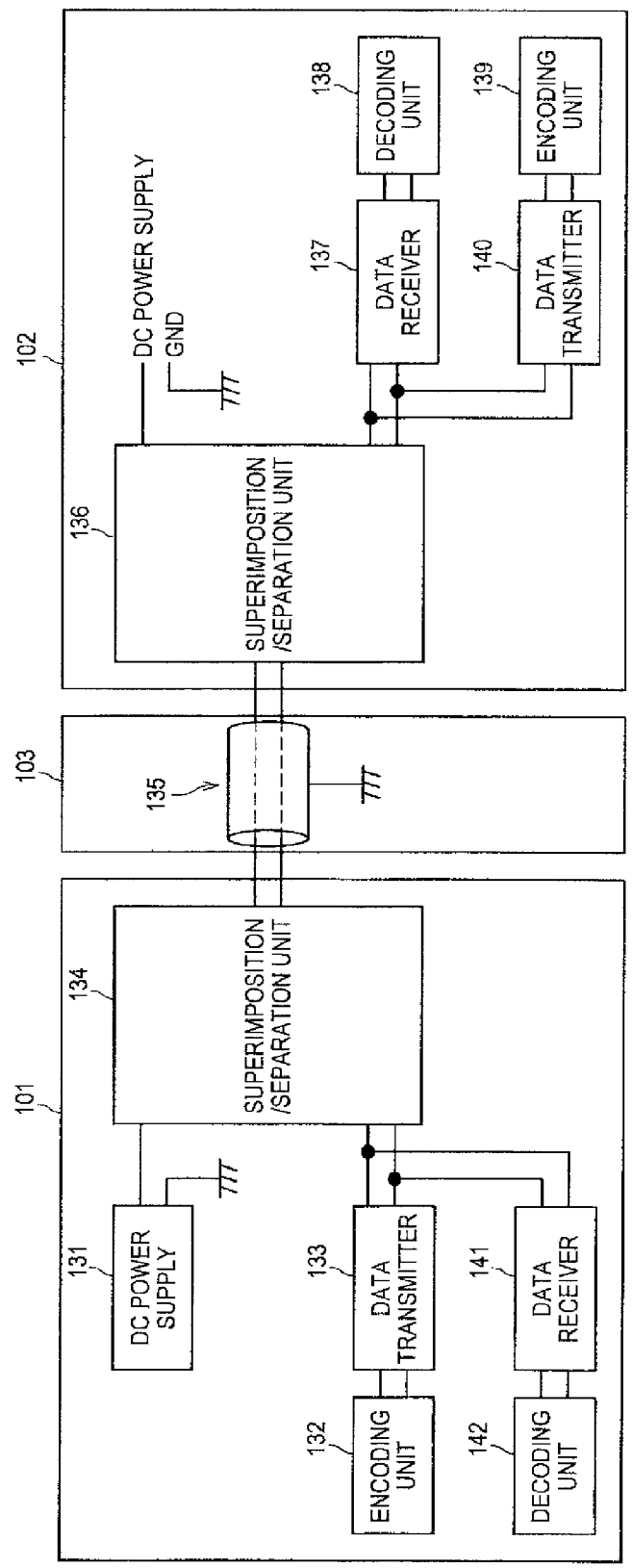
FIG. 5 is an explanatory diagram for describing a functional configuration of a mobile terminal related to data transmission.

FIG. 4 will be referred to. As shown in FIG. 4, the operation unit 101 is provided with a DC power supply 131, an encoding 132, a transmitter 133, a unit data superimposition/separation unit 134, a data receiver 141 and a decoding unit 142. Furthermore, the hinge 103 is provided with a rotating hinge 135 in which a coaxial cable is wired. For its part, the display unit 102 is provided with a superimposition/separation unit 136, a data receiver 137, a decoding unit 138, an encoding unit 139 and a data transmitter 140.

(Transmission from Operation Unit 101 to Display Unit 102)

First, transmission data output from the BBP 123 is input to the encoding unit 132. When the transmission data is input, the encoding unit 132 encodes the transmission data that is input, based on a predetermined encoding scheme, and generates encoded data. Additionally, as the predetermined encoding scheme, an encoding scheme capable of generating a code not including a DC component, such as an AMI encoding scheme, a partial response encoding scheme, a CMI encoding scheme or the like, is used. Additionally, the AMI is an abbreviation for Alternate Mark Inversion. Also, the CMI is an abbreviation for Coded Mark Inversion.

The encoded data generated by the encoding unit 132 is input to the data transmitter 133. When the encoded data is input, the data transmitter 133 generates a data signal (a predetermined impedance/voltage) based on the encoded data that is input. The data signal generated by the data transmitter 133 is input to the superimposition/separation unit 134. Furthermore, DC power is input to the superimposition/separation unit 134 from the DC power supply 131. When the data signal is input, the superimposition/separation unit 134 generates a superimposed signal by superimposing DC power on the data signal that is input. Then, the superimposed signal generated by the superimposition/separation unit 134 is transmitted to the display unit 102 through one coaxial cable wired in the rotating hinge 135.

The superimposed signal transmitted through the coaxial cable is input to the superimposition/separation unit 136 of the display unit 102. When the superimposed signal is input, the superimposition/separation unit 136 separates the superimposed signal that is input into DC power and the data signal. The DC power separated by the superimposition/separation unit 136 is supplied to each structural element of the display unit 102 as driving power. On the other hand, the data signal separated by the superimposition/separation unit 136 is input to the data receiver 137. When the data signal is input, the data receiver 137 restores the original encoded data by detecting an amplitude level of the data signal that is input. The encoded data restored by the data receiver 137 is input to the decoding unit 138.

When the encoded data is input, the decoding unit 138 restores the original transmission data by decoding the encoded data that is input, based on the predetermined encoding scheme. The transmission data that is restored by the decoding unit 138 is input to a predetermined structural element configuring the display unit 102. For example, when the transmission data is image data, the image data restored by the decoding unit 138 is input to the LCD 124. Also, when the transmission data is control data of the camera 125 or the sensor 126, the control data restored by the decoding unit 138 is input to the camera 125 or the sensor 126.

(Transmission from Display Unit 102 to Operation Unit 101)

On the other hand, transmission data output from the camera 125 or the sensor 126 is input to the encoding unit 139. When the transmission data is input, the encoding unit 139 encodes the transmission data that is input, based on a predetermined encoding scheme, and generates encoded data. Additionally, as the predetermined encoding scheme, an encoding scheme capable of generating a code not including a DC component, such as an AMI encoding scheme, a partial response encoding scheme, a CMI encoding scheme or the like, is used.

The encoded data generated by the encoding unit 139 is input to the data transmitter 140. When the encoded data is input, the data transmitter 140 generates a data signal (a predetermined impedance/voltage) based on the encoded data that is input. The data signal generated by the data transmitter 140 is input to the superimposition/separation unit 136. Furthermore, DC power is supplied to the superimposition/separation unit 136 from a DC power supply. When the data signal is input, the superimposition/separation unit 136 generates a superimposed signal by superimposing the data signal that is input on the DC power. Then, the superimposed signal generated by the superimposition/separation unit 136 is transmitted to the operation unit 101 through one coaxial cable wired in the rotating hinge 135.

The superimposed signal transmitted through the coaxial cable is input to the superimposition/separation unit 134 of the operation unit 101. When the superimposed signal is input, the superimposition/separation unit 134 separates the data signal from the superimposed signal that is input. The data signal separated by the superimposition/separation unit 134 is input to the data receiver 141. When the data signal is input, the data receiver 141 restores the original encoded data by detecting an amplitude level of the data signal that is input. The encoded data restored by the data receiver 141 is input to the decoding unit 142. When the encoded data is input, the decoding unit 142 restores the original transmission data by decoding the encoded data that is input, based on the predetermined encoding scheme. The transmission data restored by the decoding unit 142 is input to the BBP 123.

(Superimposition and Separation of DC Power)

Figure 6:
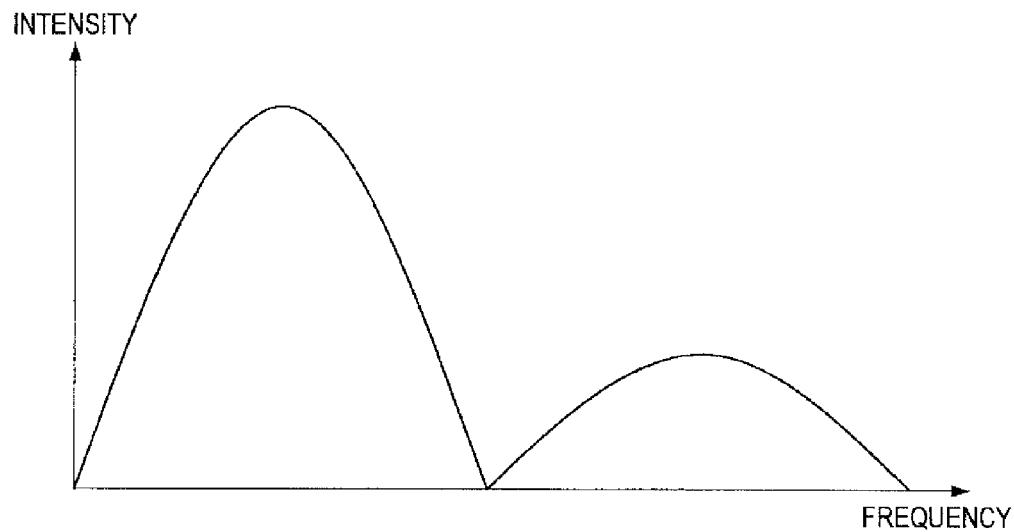
FIG. 6 is an explanatory diagram for describing a frequency spectrum of a data signal passing though a hinge portion of a mobile terminal.

As described above, the encoding scheme used by the encoding units 132 and 139 is an encoding scheme capable of generating a code not including a DC component. Accordingly, the frequency spectrum of the data signal will include no DC component, as shown in FIG. 6. Since a DC component is not included in the data signal, even if the data signal is superimposed on DC power, the data signal and the DC power can be easily extracted from the superimposed signal. The function of the superimposition/separation units 134 and 136 can be realized by a circuit configuration as shown in FIG. 7, for example.

Figure 7:
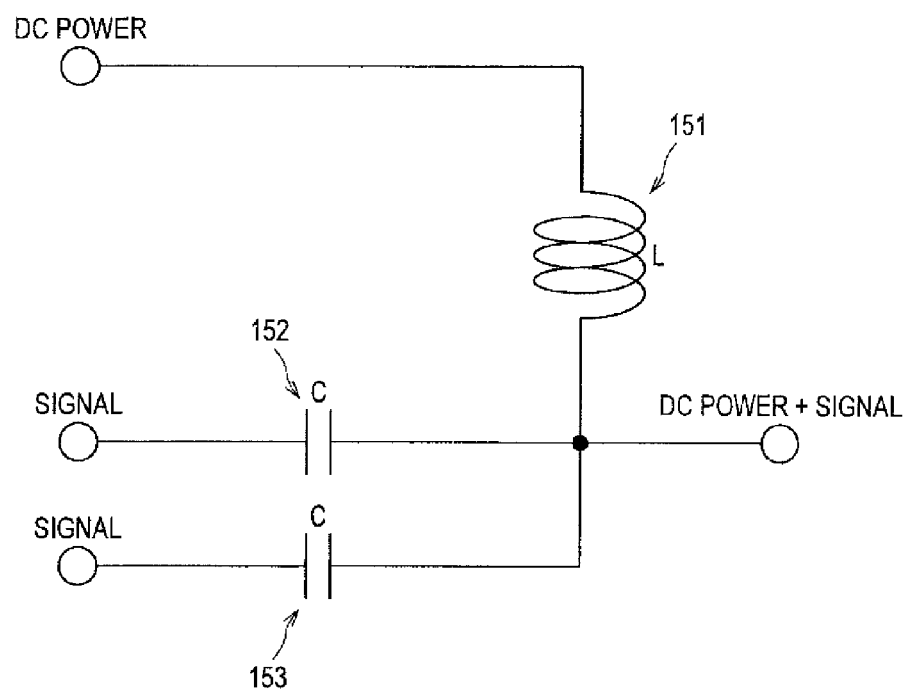
FIG. 7 is an explanatory diagram for describing a configuration of a circuit for superimposing/separating a data signal and power.

As shown in FIG. 7, the superimposition/separation unit (134, 136) is configured from an inductor 151 and two capacitors 152 and 153. The inductor 151 is means for blocking a high-frequency component included in a signal that is input. Accordingly, when a superimposed signal is passed through the inductor 151, the component of the data signal included in the superimposed signal is blocked, and only the component of the DC power included in the superimposed signal is extracted. On the other hand, the capacitors 152 and 153 are means for blocking a DC component included in a signal that is input. Accordingly, when a superimposed signal is passed through the capacitor (152, 153), the component of the DC power included in the superimposed signal is blocked, and only the component of the data signal included in, the superimposed signal is extracted.

Accordingly, in the case of separating a data signal and DC power by the superimposition/separation unit (134, 136), the DC power is separated from the superimposed signal by the inductor 151, and the data signal is extracted from the superimposed signal by the capacitor (152, 153). On the other hand, in the case of superimposing a data signal and DC power by the superimposition/separation unit (134, 136), DC power and a data signal that has passed through the capacitor (152, 153) are superimposed with each other on a signal line. In this manner, superimposition and separation of a data signal and DC power can be realized by the same circuit configuration.

(Summary of Serial Transmission Scheme)

Figure 8:
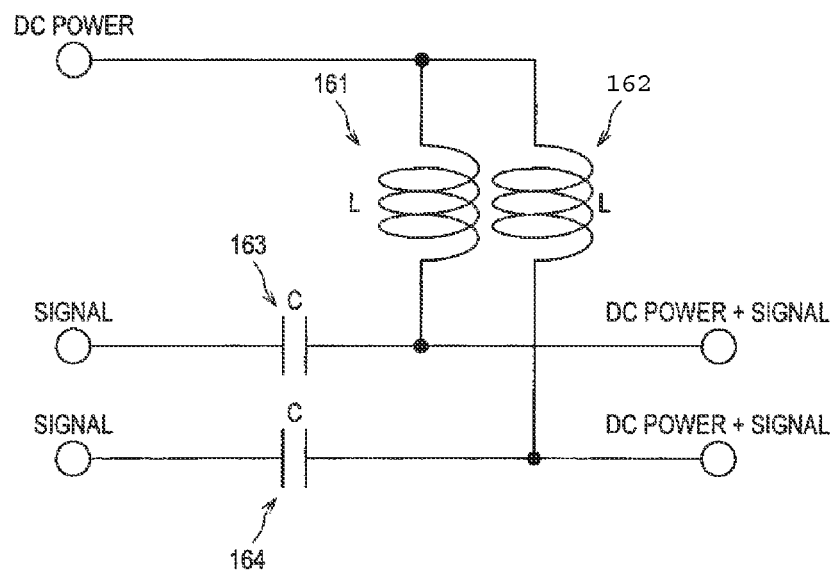
FIG. 8 is an explanatory diagram for describing a configuration of a circuit for superimposing/separating a data signal and power.

As described, when adopting the serial transmission scheme, the number of lines 113 passing through the hinge 103 can be greatly reduced. As described above, with the scheme of superimposing DC power on a data signal and transmitting the same, the data signal and the DC power can be transmitted by one coaxial cable. Furthermore, a configuration of transmitting a superimposed signal by using a coaxial cable has been described here, but modification to a configuration of differentially transmitting the superimposed signal by using a differential cable, as shown in FIG. 5, is also possible. Additionally, most of the functional configurations of the operation unit 101 and the display unit 102 are substantially the same for the case of using a differential cable. However, in the case of, using a differential cable, the circuit configuration of the superimposition/separation unit (134, 136) will be modified as shown in FIG. 8. That is, as shown in FIG. 8, the superimposition/separation unit (134, 136) will be configured from inductors 161 and 162, and capacitors 163 and 164. In this case also, a data signal and DC power can be transmitted by one differential cable (a pair of signal lines).

By reducing the number of lines 113 passing through the hinge 103 to about one as described above, the degree of freedom regarding the transformation of the hinge 103 is increased, and it becomes easier to improve the design of the mobile terminal 100. Furthermore, the risk of breaking of the lines 113 passing through the hinge 103 due to the transformation of the hinge 103 can be greatly reduced, and the reliability of the lines 113 is greatly improved. However, even if the serial transmission scheme is adopted, the line 113 will pass through the hinge 103, and it is difficult to completely avoid the breaking caused by aged deterioration. Thus, to avoid twisting of a cable, the present inventor has considered a structure of dividing a signal line into two, one on the side of the operation unit 101 and the other on the side of the display unit 102, and causing them to contact each other within the rotating hinge 135. However, a conclusion was reached that it is difficult at this point to completely eliminate the risk of occurrence of poor contact due to wear of the contact parts of the signal lines.

Thus, the present inventor has devised a mechanism for transmitting, at the contact part of the signal lines divided into the side of the operation unit 101 and the side of the display unit 102, at least the data signal by contactless communication. By providing such a mechanism, transmission of the data signal is not affected even if the contact portions of the signal lines are worn, and the reliability of the signal lines can be maintained. In the following, an embodiment related to this mechanism will be described.

2: First Embodiment

Date: Electromagnetic Coupling, Power: Electromagnetic Coupling

A first embodiment of the present disclosure will be described. The present embodiment relates to a mechanism for contactlessly transmitting a data signal and power by using electromagnetic coupling.

[2-1: Mechanism of Data Transmission that Uses Electromagnetic Coupling]

First, a mechanism of data transmission that uses electromagnetic coupling (hereinafter, electromagnetic coupling scheme) will be briefly described.

When a pair of coils (coils A, B) that are arranged facing each other are prepared and a magnetic field is generated by applying an AC current to one of the coils A, an AC current is generated in the other coil B by the magnetic field. This phenomenon is called electromagnetic induction. The electromagnetic coupling scheme is a scheme of transmitting a signal by using this electromagnetic induction. For example, when the current applied to the coil A is modulated, the magnetic filed generated by the coil A is also affected by the modulation, and thus, a current induced in the coil B is also affected by the modulation. Thus, if modulation according to transmission data is added to a current in the coil A, a change is caused in the current induced in the coil B, and the transmission data can be demodulated from the change. Transmission of data is performed in the electromagnetic coupling scheme by using such a mechanism. Additionally, since a current is induced in the coil B when a current is applied to the coil A, it is also possible to transmit power from the coil A to the coil B by using the electromagnetic coupling.

[2-2: Example Configuration 1]

Now, to realize data transmission and power transmission in a rotatable hinge 103 by the electromagnetic coupling scheme, the structure of the hinge 103 has to be refined. As the structure of the hinge 103, structures of rotating hinges 201 and 202 as shown in FIGS. 9A and 9B are conceivable, for example. Additionally, the rotating hinges 201 and 202 are assumed to be substantially tubular. Furthermore, FIG. 9A is a cross sectional view of the rotating hinges 201 and 202 cut along the rotation axes. On the other hand, FIG. 9B is a front view of the rotating hinge (201, 202) seen along the direction of extension of the rotation axis.

Figure 9A:
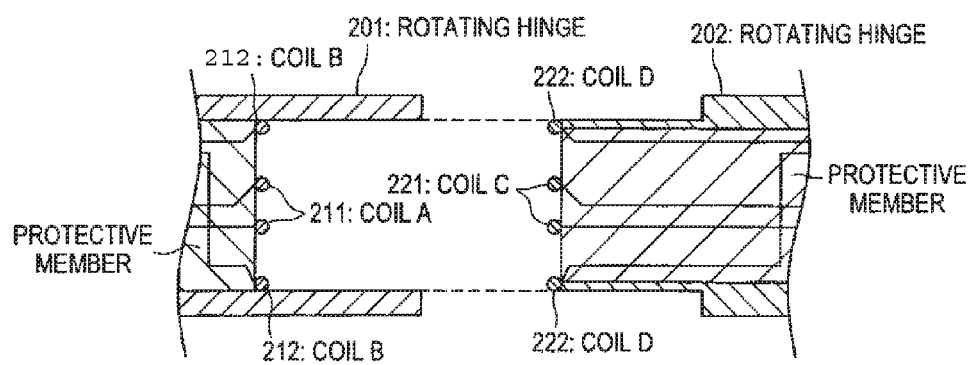
FIG. 9A is an explanatory diagram for describing a configuration (example configuration 1) of a hinge portion of a mobile terminal according to a first embodiment of the present disclosure.
Figure 9B:
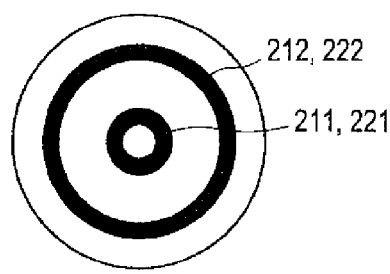
FIG. 9B is an explanatory diagram for describing a configuration (example configuration 1) of the hinge portion of the mobile terminal according to the embodiment.

As shown in FIG. 9A, the rotating hinge 201 includes inside itself a protective member, and is formed into a concave shape at the connection part to the rotating hinge 202. Furthermore, the rotating hinge 201 is provided with a coil A 211 and a coil B 212. On the other hand, the rotating hinge 202 includes inside itself a protective member, and is formed into a convex shape at the connection part to the rotating hinge 201. Furthermore, the rotating hinge 202 is provided with a coil C 221 and a coil D 222. Additionally, as shown in FIG. 9B, the coil A 211 and the coil B 212 are arranged concentrically. Similarly, the coil C 221 and the coil D 222 are arranged concentrically.

For example, power is transmitted using electromagnetic coupling that is formed by the coil A 211 and the coil C 221 by applying an AC current to the coil A 211. Furthermore, a data signal is transmitted using electromagnetic coupling that is formed by the coil B 212 and the coil D 222 by applying an AC current to the coil B 212. Additionally, the power is transmitted using a low frequency (for example, 100 kHz) and the data signal is transmitted using a high frequency (for example, 100 MHz) so that the power and the data signal will not interfere with each other. Furthermore, FIGS. 9A and 9B show a one-turn coil as the coil A 211, the coil B 212, the coil C 221 and the coil D 222, but the number of turns of a coil is set as necessary. For example, the number of turns will be set to a large number for the coil A 211 and the coil C 221 used for transmission of power so as to adapt the characteristics to the low frequency.

[2-3: Example Configuration 2]

Figure 10:
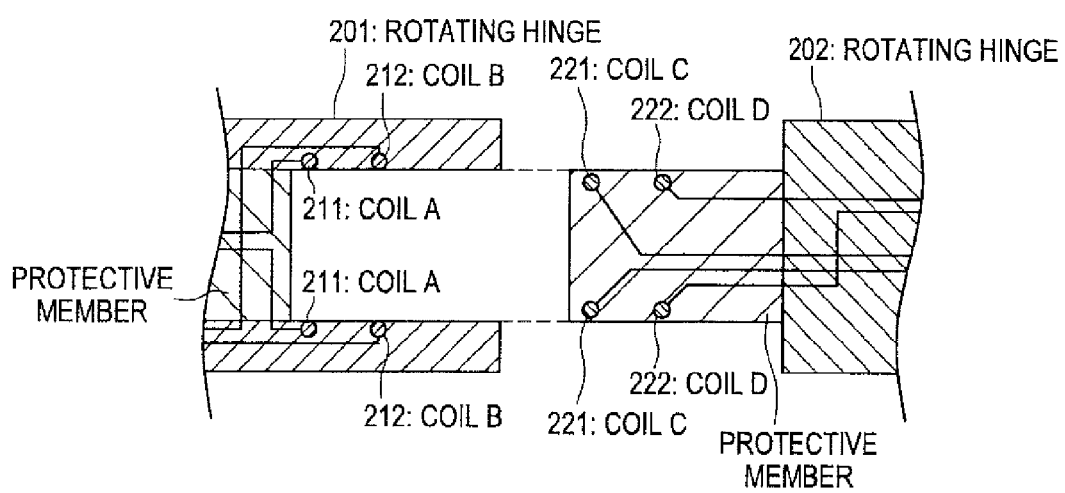
FIG. 10 is an explanatory diagram for describing a configuration (example configuration 2) of the hinge portion of the mobile terminal according to the embodiment.

Now, according to the example configuration 1 described above, the coil A 211 and the coil C 221, and the coil B 212 and the coil D 222 were arranged facing each other. However, with a configuration where a magnetic flux produced by one of the coils passes through the frame of the other coil, electromagnetic coupling can be generated between the coils. Thus, structures of the rotating hinge 201 and 202 as shown in FIG. 10 are also conceivable as the structure of the hinge 103 capable of data transmission and power transmission according to the electromagnetic coupling scheme. Additionally, the rotating hinges 201 and 202 are assumed to be substantially tubular also in FIG. 10. Furthermore, FIG. 10 is a cross sectional view of the rotating hinges 201 and 202 cut along the rotation axes.

As shown in FIG. 10, the rotating hinge 201 includes inside itself a protective member, and is formed into a concave shape at the connection part to the rotating hinge 202. Furthermore, the rotating hinge 201 is provided with a coil A 211 and a coil B 212. On the other hand, the rotating hinge 202 includes inside itself a protective member, and is formed into a convex shape at the connection part to the rotating hinge 201. Furthermore, the rotating hinge 202 is provided with a coil C 221 and a coil D 222. Additionally, as shown in FIG. 10, the coil A 211 and the coil B 212 are arranged on the same diameter so as to be parallel along the length direction of the rotating hinge 201. Similarly, the coil C 221 and the coil D 222 are arranged on the same diameter so as to be parallel in the length direction of the rotating hinge 202.

For example, power is transmitted using electromagnetic coupling that is formed by the coil A 211 and the coil C 221 by applying an AC current to the coil A 211. Furthermore, a data signal is transmitted using electromagnetic coupling that is formed by the coil B 212 and the coil D 222 by applying an AC current to the coil B 212. Additionally, the power is transmitted using a low frequency (for example, 100 kHz) and the data signal is transmitted using a high frequency (for example, 100 MHz) so that the power and the data signal will not interfere with each other. Furthermore, FIG. 10 shows a one-turn coil as the coil A 211, the coil B 212, the coil C 221 and the coil D 222, but the number of turns of a coil is set as necessary.

[2-4: Functional Configuration Related to Data Transmission and Power Transmission]

Figure 11:
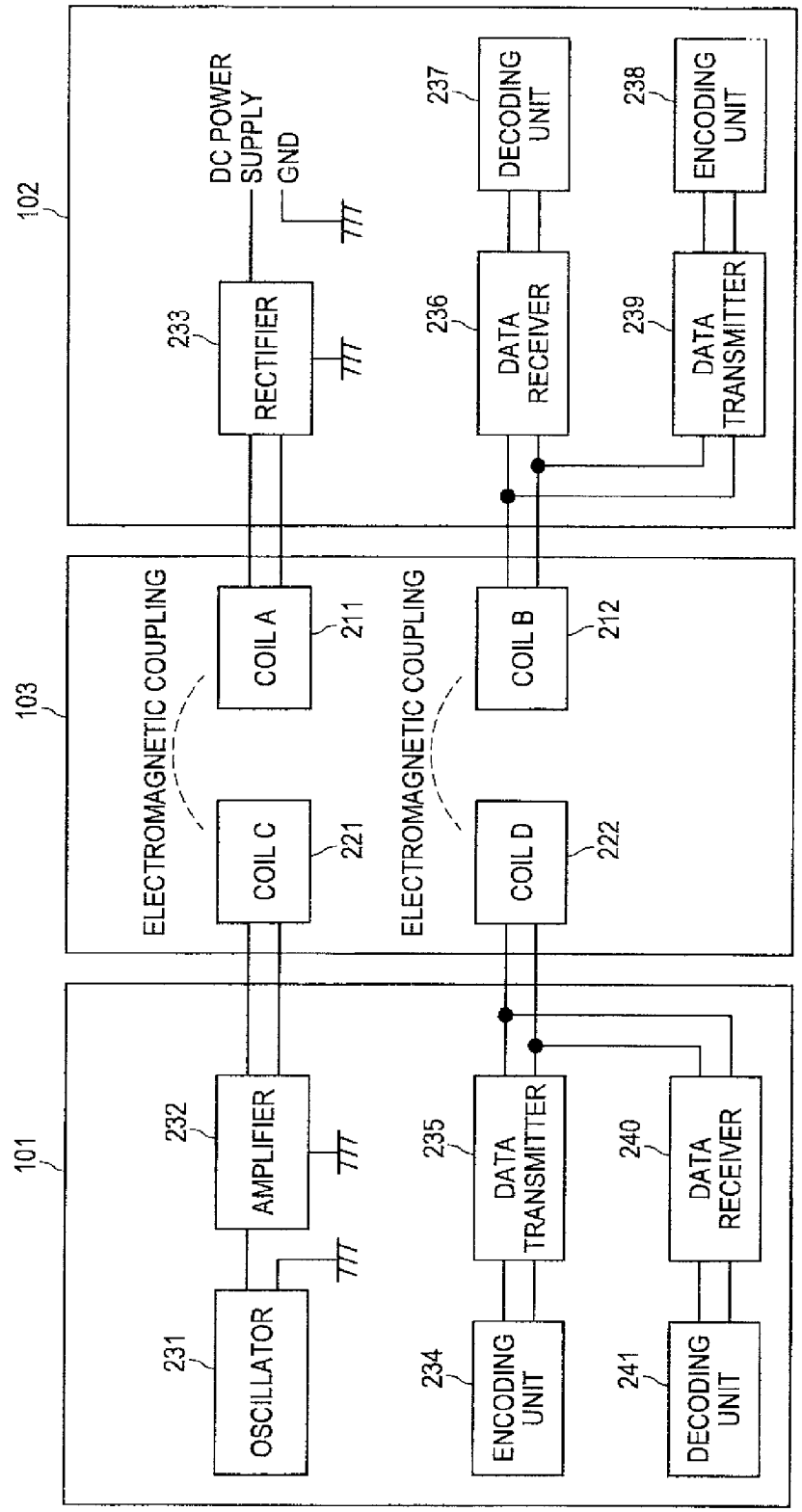
FIG. 11 is an explanatory diagram for describing a functional configuration of the mobile terminal according to the embodiment.

Here, a circuit configuration capable of realizing the data transmission and the power transmission according to the present embodiment will be described with reference to FIG. 11. FIG. 11 is an explanatory diagram for describing a circuit configuration capable of realizing the data transmission and the power transmission according to the present embodiment.

(Power Transmission)

In the example of FIG. 11, the main structural elements related to power transmission are an oscillator 231 and an amplifier 232 provided in the operation unit 101, a coil C 221 and a coil A 211 provided in the hinge 103 (rotating hinges 201, 202), and a rectifier 233 provided in the display unit 102.

First, AC power is output from the oscillator 231 and is input to the amplifier 232. Then, the AC power input to the amplifier 232 is amplified to a predetermined power level by the amplifier 232, and is applied to the coil C 221. When the AC power is applied to the coil C 221, electromagnetic coupling is formed between the coil C 221 and the coil A 211, and a current is induced in the coil A 211. The current induced in the coil A 211 is input to the rectifier 233 as AC power. The AC power input to the rectifier 233 is converted from AC to DC by the rectifier 233, and is input to each structural element of the display unit 102 as DC power for driving.

(Data Transmission)

In the example of FIG. 11, the main structural elements related to data transmission are an encoding unit 234, a data transmitter 235, a decoding unit 241 and a data receiver 240 provided in the operation unit 101, a coil D 222 and a coil B 212 provided in the hinge 103 (rotating hinges 201, 202), and a data receiver 236, a decoding unit 237, an encoding unit 238 and a data transmitter 239 provided in the display unit 102.

(Data Transmission from Operation Unit 101 to Display Unit 102)

First, transmission data output from the BBP 123 is input to the encoding unit 234. When the transmission data is input, the encoding unit 234 encodes the transmission data that is input, based on a predetermined encoding scheme, and generates encoded data. As the predetermined encoding scheme, an encoding scheme capable of generating a code not including a DC component, such as an AMI encoding scheme, a partial response encoding scheme, a CMI encoding scheme or the like, is used. Additionally, in the case of using electromagnetic coupling, it is not possible to transmit a DC component. Thus, the transmission data is encoded at the encoding unit 234 into encoded data that does not include a DC component such that a DC component is not included in a data signal.

The encoded data generated by the encoding unit 234 is input to the data transmitter 235. When the encoded data is input, the data transmitter 235 generates a data signal (current) based on the encoded data that is input. The data signal (current) generated by the data transmitter 235 is applied to the coil D 222. When the current is applied to the coil D 222, electromagnetic coupling is formed between the coil D 222 and the coil B 212, and an induced current is generated in the coil B 212. That is, the data signal is transmitted from the coil D 222 to the coil B 212.

The induced current (data signal) generated in the coil B 212 is input to the data receiver 236. When the induced current (data signal) is input, the data receiver 236 determines the amplitude level of the induced current (data signal) that is input, and restores the original encoded data. The encoded data restored by the data receiver 236 is input to the decoding unit 237. When the encoded data is input, the decoding unit 237 decodes the encoded data that is input, based on the predetermined encoding scheme, and restores the original transmission data. The transmission data restored by the decoding unit 237 is input to a predetermined structural element configuring the display unit 102 (for example, the LCD 124 or the like).

(Data Transmission from Display Unit 102 to Operation Unit 101)

On the other hand, transmission data output from the camera 125, the sensor 126 or the like is input to the encoding unit 238. When the transmission data is input, the encoding unit 238 encodes the transmission data that is input, based on a predetermined encoding scheme, and generates encoded data. Additionally, as the predetermined encoding scheme, an encoding scheme capable of generating a code not including a DC component, such as an AMI encoding scheme, a partial response encoding scheme, a CMI encoding scheme or the like, is used. As described above, in the case of using electromagnetic coupling, it is not possible to transmit a DC component. Thus, the transmission data is encoded at the encoding unit 238 into encoded data that does not include a DC component such that a DC component is not included in a data signal.

The encoded data generated by the encoding unit 238 is input to the data transmitter 239. When the encoded data is input, the data transmitter 239 generates a data signal (current) based on the encoded data that is input. The data signal (current) generated by the data transmitter 239 is applied to the coil B 212. When the current is applied to the coil B 212, electromagnetic coupling formed between the coil B 212 and the coil D 222, and an induced current is generated in the coil D 222. That is, the data signal is transmitted from the coil B 212 to the coil D 222.

The induced current (data signal) generated in the coil D 222 is input to the data receiver 240. When the induced current (data signal) is input, the data receiver 240 determines the amplitude level of the induced current (data signal) that is input, and restores the original encoded data. The encoded data restored by the data receiver 240 is input to the decoding unit 241. When the encoded data is input, the decoding unit 241 decodes the encoded data that is input, based on the predetermined encoding scheme, and restores the original transmission data. The transmission data restored by the decoding unit 241 is input to the BBP 123.

In the foregoing, the mechanisms of the data transmission and the power transmission according to the present embodiment have been described. As described above, the mobile terminal 100 according to the present embodiment transmits a data signal and power by the electromagnetic coupling scheme. Accordingly, the signal line on the side of the operation unit 101 and the signal line on the side of the display unit 102 do not contact each other in the hinge 103. As a result, transformation of the hinge 103 does not break the signal lines and does not cause poor contact that would result from wear of the contact parts of the signal lines.

3: Second Embodiment

Data: Capacitive Coupling, Power: Electromagnetic Coupling

Next, a second embodiment of the present disclosure will be described. The present embodiment relates to a mechanism of using capacitive coupling for transmission of a data signal and electromagnetic coupling for transmission of power.

[3-1: Mechanism of Data Transmission that Uses Capacitive Coupling]

First, a mechanism of data transmission that uses capacitive coupling (hereinafter, capacitive coupling scheme) will be briefly described.

When a pair of electrodes (electrodes A, B) that are arranged facing each other are prepared and an electric charge is applied to one of the electrodes A, an electric charge of a sign opposite the sign for the electrode A is induced at the electrode B that is arranged facing the electrode A. This phenomenon is called capacitive coupling. The capacitive coupling scheme is a scheme of transmitting a signal by using this capacitive coupling. For example, when the electric charge that is applied to the electrode A is changed over time, the electric charge induced at the electrode B is also changed over time. Thus, if the electric charge to be applied to the electrode A is changed according to the signal that is to be transmitted, the electric charge that will be induced at the electrode B will also change according to the signal. Therefore, the signal can be detected on the side of the electrode B by observing the electric charge induced at the electrode B. According to the capacitive coupling scheme, data is transmitted using such a mechanism.

[3-2: Example Configuration 1]

Now, to realize data transmission by the capacitive coupling scheme and power transmission by the electromagnetic coupling scheme in a rotatable hinge 103, the structure of the hinge 103 has to be refined. As the structure of the hinge 103, structures of rotating hinges 301 and 302 as shown in FIGS. 12 and 13 are conceivable, for example. Additionally, the rotating hinges 301 and 302 are assumed to be substantially tubular. Furthermore, FIG. 12 is a cross sectional view of the rotating hinges 301 and 302 cut along the rotation axes. On the other hand, FIG. 13 is a solid diagram showing in three dimension the structures of the rotation hinges 301 and 302 shown in FIG. 12.

Figure 12:
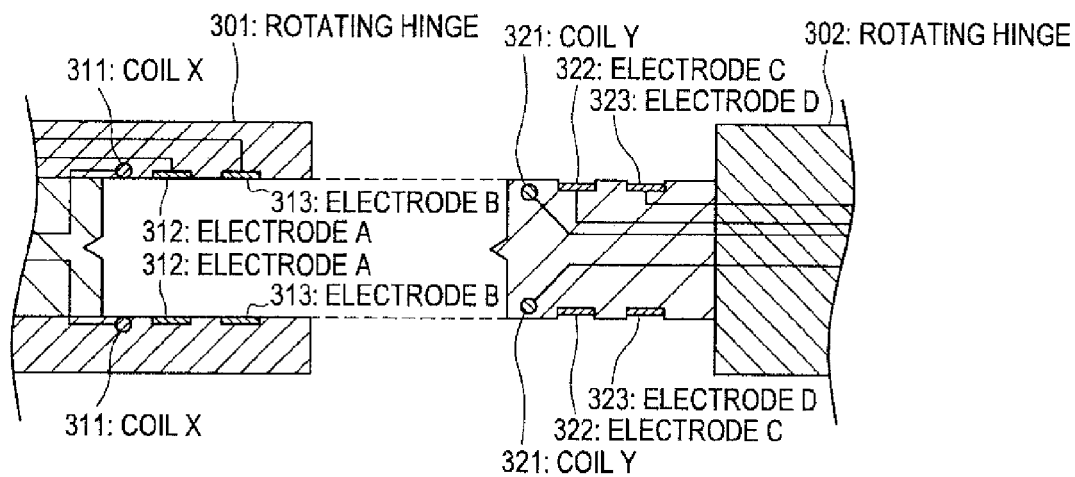
FIG. 12 is an explanatory diagram for describing a configuration (example configuration 1) of a hinge portion of a mobile terminal according to a second embodiment of the present disclosure.
Figure 13:
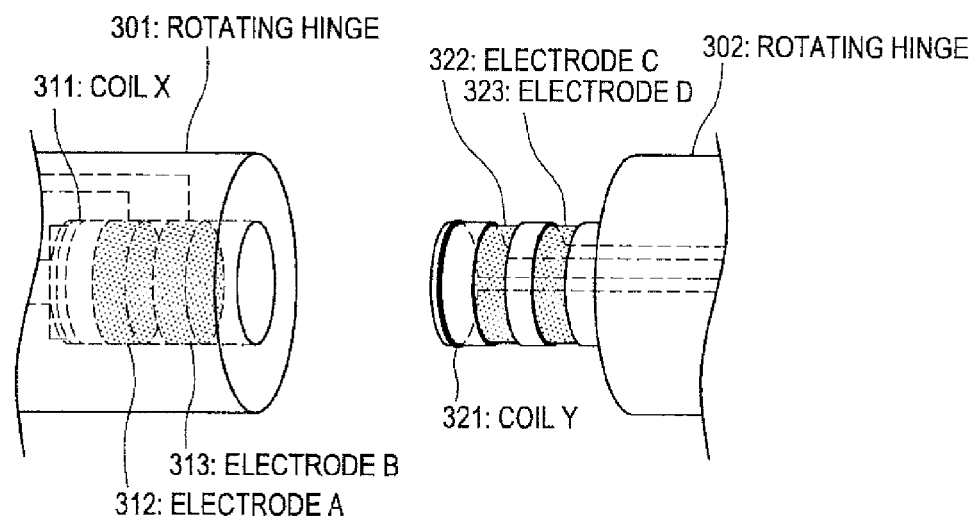
FIG. 13 is an explanatory diagram for describing a configuration (example configuration 1) of the hinge portion of the mobile terminal according to the embodiment.

As shown in FIGS. 12 and 13, the rotating hinge 301 is formed into a concave shape at the connection part to the rotating hinge 302. Furthermore, the rotation hinge 301 is provided with a coil X 311, a tubular electrode A 312 and a tubular electrode B 313. On the other hand, the rotating hinge 302 is formed into a convex shape at the connection part to the rotating hinge 301. Furthermore, the rotating hinge 302 is provided with a coil Y 321, a tubular electrode C 322 and a tubular electrode D 323. Additionally, it is arranged such that the coil X 311 and the coil Y 321, the electrode A 312 and the electrode C 322, and the electrode B 313 and the electrode D 323 do not contact each other when the concave portion of the rotating hinge 301 and the convex portion of the rotating hinge 302 are fitted together.

Power is transmitted using electromagnetic coupling that is formed between the coil X 311 and the coil Y 321 by applying an AC current to the coil X 311. Furthermore, a data signal is transmitted using capacitive coupling that is formed between the electrode A 312 and the electrode C 322 by applying an electric charge to the electrode A 312 and capacitive coupling that is formed between the electrode B 313 and the electrode D 323 by applying an electric charge to the electrode B 313. Additionally, the electrode A 312 and the electrode B 313 are connected, and when an electric charge is applied to the electrode A 312, an electric charge of a sign opposite from that applied to the electrode A 312 is applied to the electrode B 313 at the same time. Similarly, the electrode C 322 and the electrode D 323 are connected, and when an electric charge is applied to the electrode C 322, an electric charge of a sign opposite from that applied to the electrode C 322 is applied to the electrode D 323 at the same time.

Furthermore, when an electric charge is applied to the electrode A 312, an electric charge of an opposite sign is induced at the electrode C 322 that is arranged facing the electrode A 312. At the same time, an electric charge of a sign opposite from the electric charge applied to the electrode A 312 is applied to the electrode B 313, and an electric charge of a sign opposite from the electric charge applied to the electrode B 313 is induced at the electrode D 323 that is arranged facing the electrode B 313. That is, when a current is applied between the electrode A 312 and the electrode B 313, capacitive coupling is formed between the electrode A 312 and the electrode C 322 and between the electrode B 313 and the electrode D 323, and a current is induced between the electrode C 322 and the electrode D 323. Accordingly, by changing, based on encoded data, the amplitude level of the current applied between the electrode A 312 and the electrode B 313, the change is passed on as the change in current between the electrode C 322 and the electrode D 323, and transmission of a data signal is realized.

By controlling the current to be applied to the electrode A 312 and the electrode B 313, a data signal can be transmitted to the side of the electrode C 322 and the electrode D 323 using capacitive coupling. Additionally, FIGS. 12 and 13 show a one-turn coil as the coil X 311 and the coil Y 321, but the number of turns of a coil is set as necessary. For example, the number of turns will be set to a large number for the coil X 311 and the coil Y 321 use d for transmission of power so as to adapt the characteristics to the low frequency.

[3-3: Example Configuration 2]

Now, according to the example configuration 1 described above, the tubular electrodes A 312 and C 322, and the tubular electrodes B 313 and D 323 were arranged to face each other at the time of connection of the rotating hinges 301 and 302. However, transmission of power and a data signal can be realized if the coil X 311 and the coil Y 321, the electrode A 312 and the electrode C 322, and the electrode B 313 and the electrode D 323 are arranged to face each other at the time of the transmission of the power and the data signal. Accordingly, the structures of the rotating hinges 301 and 302 configuring the hinge 103 may be the structure as shown in FIG. 14.

Figure 14:
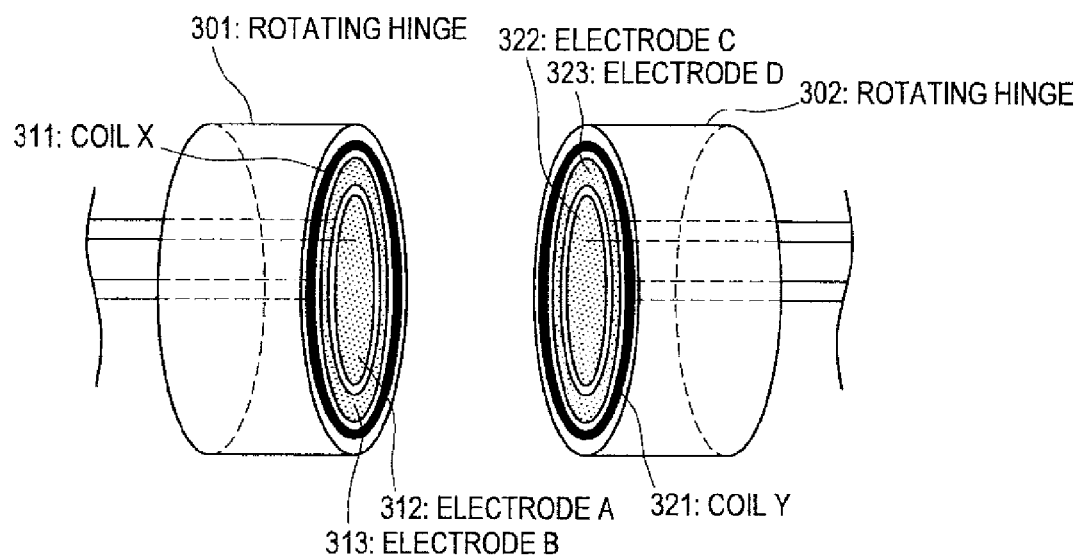
FIG. 14 is an explanatory diagram for describing a configuration (example configuration 2) of the hinge portion of the mobile terminal according to the embodiment.

The structure illustrated in FIG. 14 is designed such that the coil X 311 and the coil Y 321, the electrode A 312 and the electrode C 322, and the electrode B 313 and the electrode D 323 face each other when the rotating hinge 301 and the rotating hinge 302 are arranged to face each other. Additionally, the positional relationship between the coil X 311 and the coil Y 321 is set such that the magnetic flux generated at the time a current is applied to the coil X 311 passes within the circumference of the coil Y 321. Furthermore, the positional relationship between the electrode A 312 and the electrode C 322 is set such that an electric charge is induced at the electrode C 322 when an electric charged is applied to the electrode A 312. Similarly, the positional relationship between the electrode B 313 and the electrode D 323 is set such that an electric charge is induced at the electrode D 323 when an electric charge is applied to the electrode B 313.

Additionally, the rotating hinges 301 and 302 are arranged separate from each other so that the electrodes and the coils do not directly contact each other at the time of transmission of data and power. Also, a protective coating covering the surface of each coil and each electrode may also be provided so that even if the rotating hinges 301 and 302 contact each other, the coil X 311 and the coil Y 321, the electrode A 312 and the electrode C 322, and the electrode B 313 and the electrode D 323 do not contact each other. Additionally, a dielectric material is used for the protective coating. Furthermore, it is also possible to place the coil X 311, the electrode A 312 and the electrode B 313 embedded inside the rotating hinge 301, and the coil Y 321, the electrode C 322 and the electrode D 323 embedded inside the rotating hinge 302.

[3-4: Functional Configuration Related to Data Transmission and Power Transmission]

Figure 15:
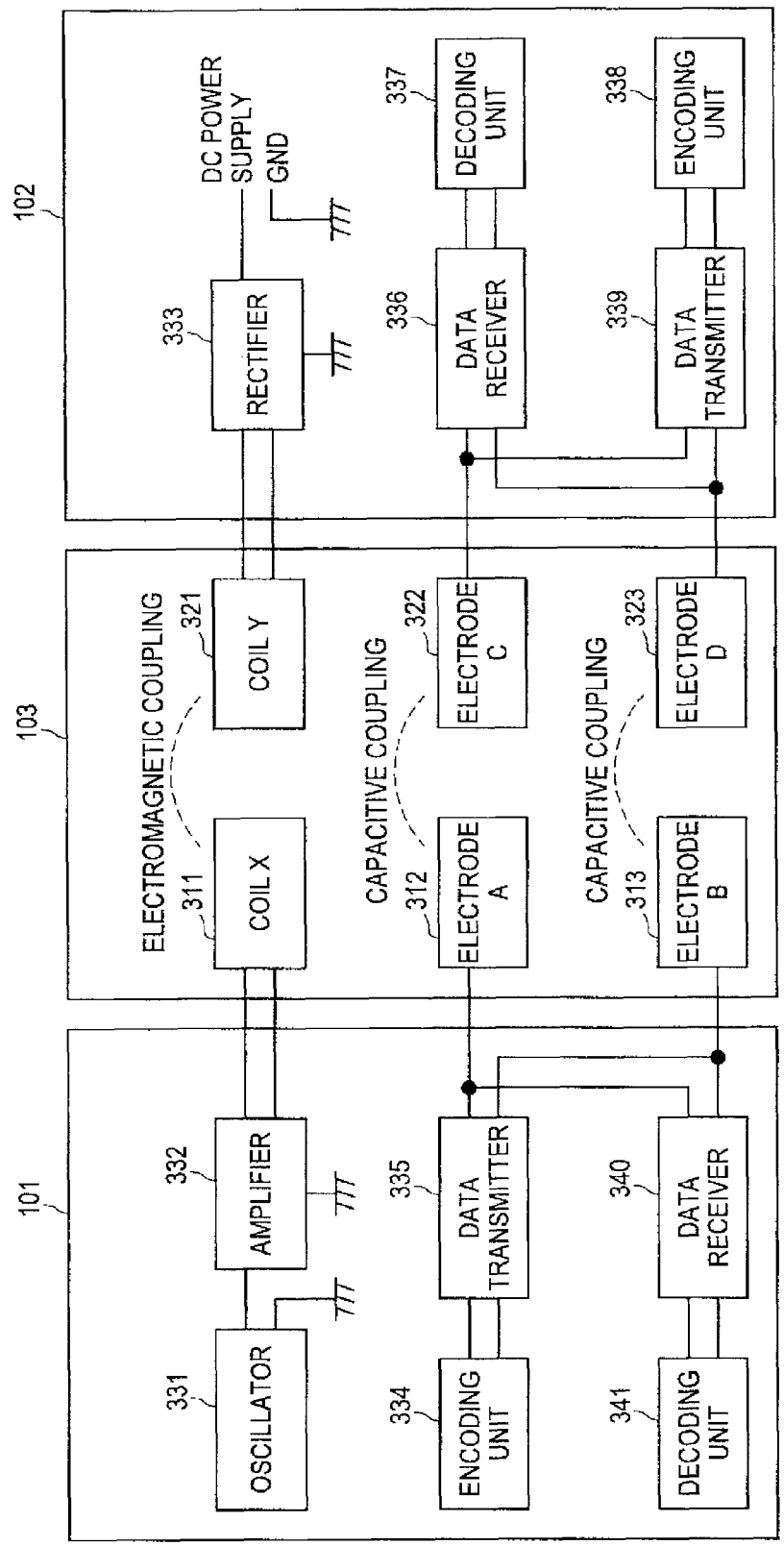
FIG. 15 is an explanatory diagram for describing a functional configuration of the mobile terminal according to the embodiment.

Here, a circuit configuration capable of realizing the data transmission and the power transmission according to the present embodiment will be described with reference to FIG. 15. FIG. 15 is an explanatory diagram for describing a circuit configuration capable of realizing the data transmission and the power transmission according to the present embodiment.

(Power Transmission)

In the example of FIG. 15, the main structural elements related to power transmission are an oscillator 331 and an amplifier 332 provided in the operation unit 101, a coil X 311 and a coil Y 321 provided in the hinge 103 (rotating hinges 301, 302), and a rectifier 333 provided in the display unit 102.

First, AC power is output from the oscillator 331 and is input to the amplifier 332. Then, the AC power input to the amplifier 332 is amplified to a predetermined power level by the amplifier 332, and is applied to the coil X 311. When the AC power is applied to the coil X 311, electromagnetic coupling is formed between the coil X 311 and the coil Y 321, and a current is induced in the coil Y 321. The current induced in the coil Y 321 is input to the rectifier 333 as AC power. The AC power input to the rectifier 333 is converted from AC to DC by the rectifier 333, and is input to each structural element of the display unit 102 as DC power for driving.

(Data Transmission)

In the example of FIG. 15, the main structural elements related to data transmission are an encoding unit 334, a data transmitter 335, a decoding unit 341 and a data receiver 340 provided in the operation unit 101, an electrode A 312, an electrode B 313, an electrode C 322 and an electrode D 323 provided in the hinge 103 (rotating hinges 301, 302), and a data receiver 336, a decoding unit 337, an encoding unit 338 and a data transmitter 339 provided in the display unit 102.

(Data Transmission from Operation Unit 101 to Display Unit 102)

First, transmission data output from the BBP 123 is input to the encoding unit 334. When the transmission data is input, the encoding unit 334 encodes the transmission data that is input, based on a predetermined encoding scheme, and generates encoded data. As the predetermined encoding scheme, an encoding scheme capable of generating a code not including a DC component, such as an AMI encoding scheme, a partial response encoding scheme, a CMI encoding scheme or the like, is used. Additionally, in the case of using capacitive coupling, it is not possible to transmit a DC component. Thus, the transmission data is encoded at the encoding unit 334 into encoded data that does not include a DC component such that a DC component is not included in a data signal.

The encoded data generated by the encoding unit 334 is input to the data transmitter 335. When the encoded data is input, the data transmitter 335 applies a current (data signal) of an amplitude level that is based on the encoded data between the electrode A 312 and the electrode B 313. When the current is applied between the electrode A 312 and the electrode B 313, electric charges are applied to the electrode A 312 and the electrode B 313, and electric charges of respectively opposite signs are induced at the electrode C 322 and the electrode D 323 due to capacitive coupling. That is, a current (data signal) is induced between the electrode C 322 and the electrode D 323. A data signal is transmitted using capacitive coupling formed, in this manner, between the electrode A 312 and the electrode C 322 and between the electrode B 313 and the electrode D 323.

The current (data signal) induced between the electrode C 322 and the electrode D 323 is input to the data receiver 336. When this current (data signal) is input, the data receiver 336 determines the amplitude level of the current (data signal) that is input, and restores the original encoded data. The encoded data restored by the data receiver 336 is input to the decoding unit 337. When the encoded data is input, the decoding unit 337 decodes the encoded data that is input, based on the predetermined encoding scheme, and restores the original transmission data. The transmission data restored by the decoding unit 337 is input to a predetermined structural element configuring the display unit 102 (for example, the LCD 124 or the like).

(Data Transmission from Display Unit 102 to Operation Unit 101)

On the other hand, transmission data output from the camera 125, the sensor 126 or the like is input to the encoding unit 338. When the transmission data is input, the encoding unit 338 encodes the transmission data that is input, based on a predetermined encoding scheme, and generates encoded data. Additionally, as the predetermined encoding scheme, an encoding scheme capable of generating a code not including a DC component, such as an AMI encoding scheme, a partial response encoding scheme, a CMI encoding scheme or the like, is used. In the case of using capacitive coupling, it is not possible to transmit a DC component. Thus, the transmission data is encoded at the encoding unit 338 into encoded data that does not include a DC component such that a DC component is not included in a data signal.

The encoded data generated by the encoding unit 338 is input to the data transmitter 339. When the encoded data is input, the data transmitter 339 applies a current (data signal) of an amplitude level that is based on the encoded data between the electrode C 322 and the electrode D 323. When the current is applied between the electrode C 322 and the electrode D 323, electric charges are applied to the electrode C 322 and the electrode D 323, and electric charges of respectively opposite signs are induced at the electrode A 312 and the electrode B 313 due to capacitive coupling. That is, a current (data signal) is induced between the electrode A 312 and the electrode B 313. A data signal is transmitted using capacitive coupling formed, in this manner, between the electrode A 312 and the electrode C 322 and between the electrode B 313 and the electrode D 323.

The current (data signal) induced between the electrode A 312 and the electrode B 313 is input to the data receiver 340. When this current (data signal) is input, the data receiver 340 determines the amplitude level of the current (data signal) that is input, and restores the original encoded data. The encoded data restored by the data receiver 340 is input to the decoding unit 341. When the encoded data is input, the decoding unit 341 decodes the encoded data that is input, based on the predetermined encoding scheme, and restores the original transmission data. The transmission data restored by the decoding unit 341 is input to the BBP 123.

In the foregoing, the mechanisms of the data transmission and the power transmission according to the present embodiment have been described. As described above, the mobile terminal 100 according to the present embodiment transmits power by the electromagnetic coupling scheme and a data signal by the capacitive coupling scheme. Accordingly, the signal line on the side of the operation unit 101 and the signal line on the side of the display unit 102 do not contact each other in the hinge 103. As a result, transformation of the hinge 103 does not break the signal lines and does not cause poor contact that would result from wear of the contact parts of the signal lines.

4: Third Embodiment

Data: Capacitive Coupling, Power: Capacitive Coupling

Next, a third embodiment of the present disclosure will be described. The present embodiment relates to a mechanism of using capacitive coupling for transmission of a data signal and power.

[4-1: Example Configuration 1]

Now, to realize data transmission and power transmission by the capacitive coupling scheme in a rotatable hinge 103, the structure of the hinge 103 has to be refined. As the structure of the hinge 103, structures of rotating hinges 401 and 402 as shown in FIGS. 16 and 17 are conceivable, for example. Additionally, the rotating hinges 401 and 402 are assumed to be substantially tubular. Furthermore, FIG. 16 is a cross sectional view of the rotating hinges 401 and 402 cut through the rotation axes. On the other hand, FIG. 17 is a solid diagram showing in three dimension the structures of the rotation hinges 401 and 402 shown in FIG. 16.

Figure 16:
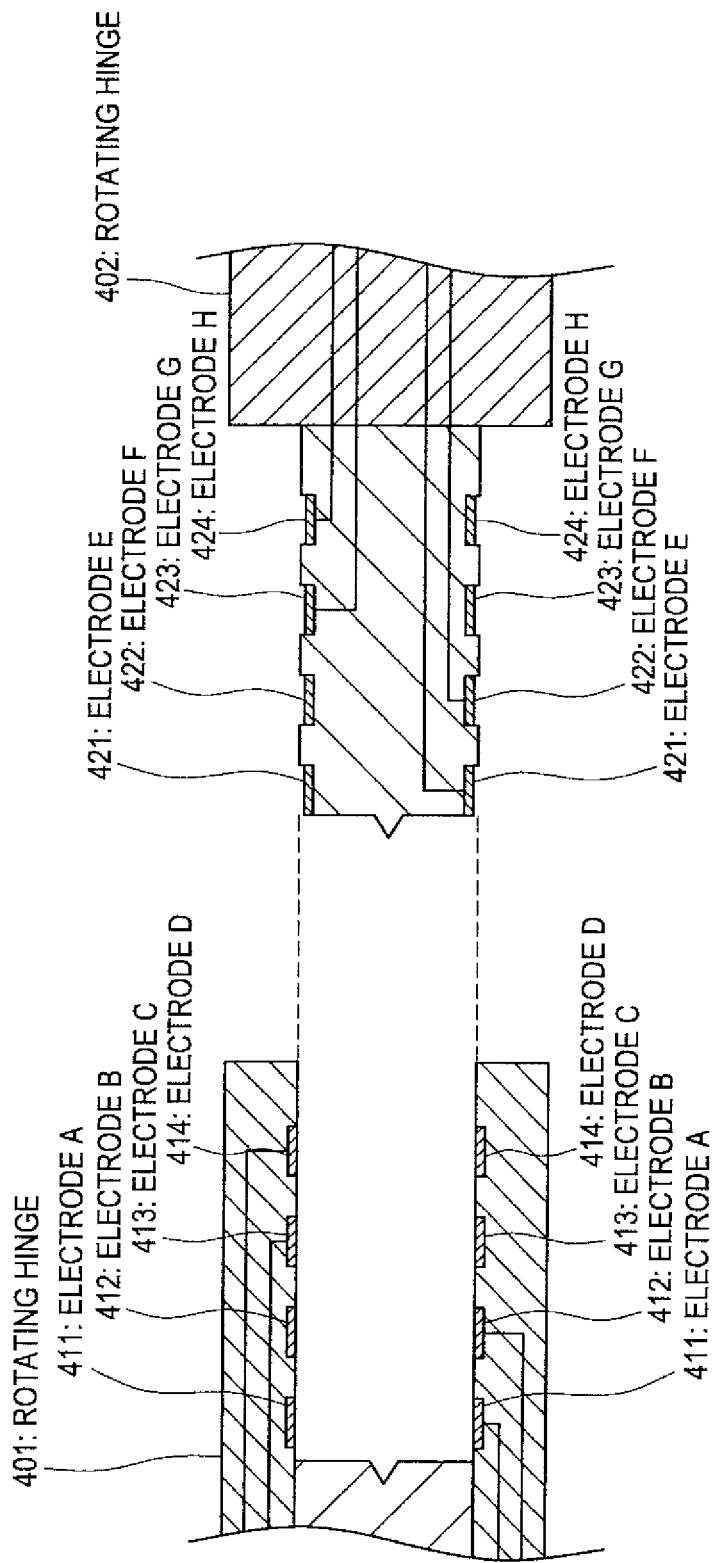
FIG. 16 is an explanatory diagram for describing a configuration (example configuration 1) of a hinge portion of a mobile terminal according to a third embodiment of the present disclosure.
Figure 17:
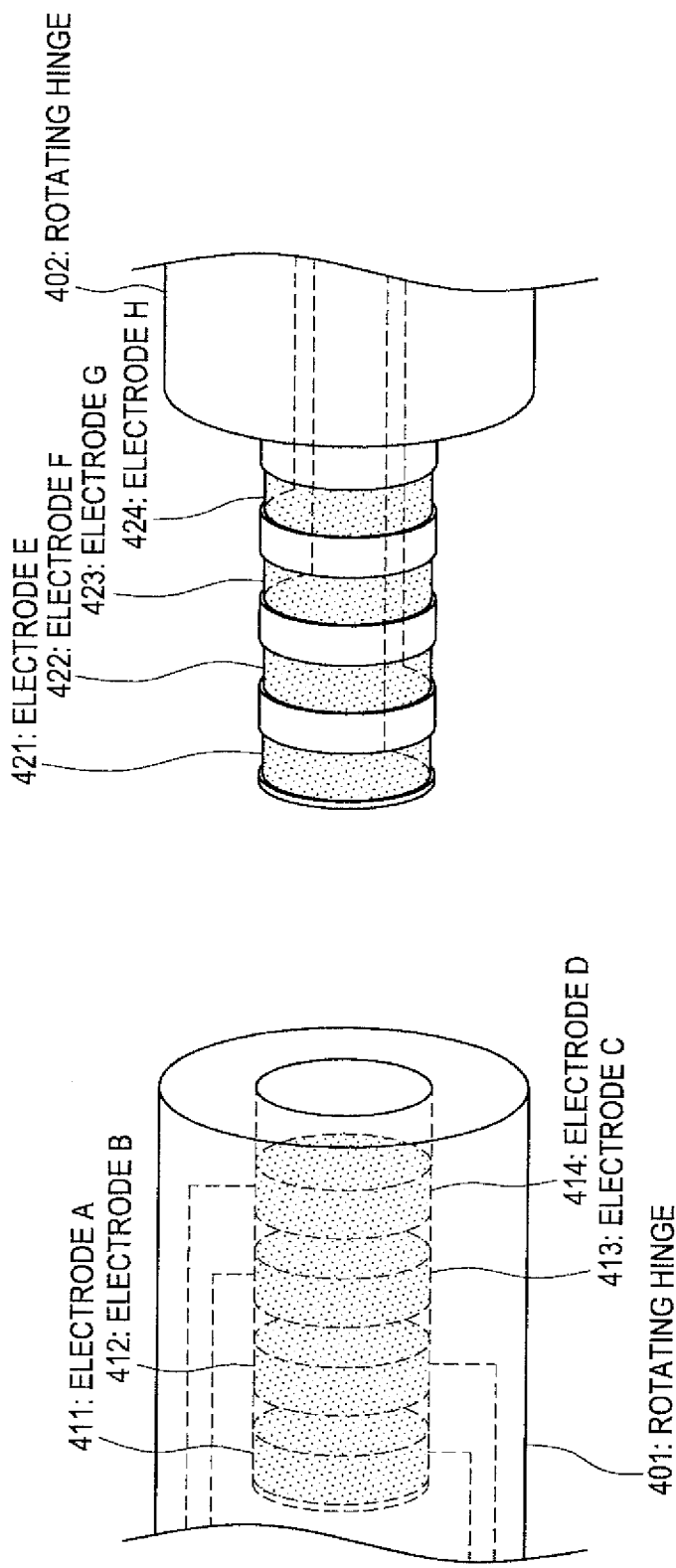
FIG. 17 is an explanatory diagram for describing a configuration (example configuration 1) of the hinge portion of the mobile terminal according to the embodiment.

As shown in FIGS. 16 and 17, the rotating hinge 401 is formed into a concave shape at the connection part to the rotating hinge 402. Furthermore, the rotation hinge 401 is provided with a tubular electrode A 411, a tubular electrode B 412, a tubular electrode C 413 and a tubular electrode D 414. On the other hand, the rotating hinge 402 is formed into a convex shape at the connection part to the rotating hinge 401. Furthermore, the rotating hinge 402 is provided with a tubular electrode E 421, a tubular electrode F 422, a tubular electrode G 423 and a tubular electrode H 424. Additionally, it is arranged such that the electrode A 411 and the electrode E 421, the electrode B 412 and the electrode F 422, the electrode C 413 and the electrode G 423, and the electrode D 414 and the electrode H 424 do not contact each other when the concave portion of the rotating hinge 401 and the convex portion of the rotating hinge 402 are fitted together.

Power is transmitted using capacitive coupling that is formed between the electrode A 411 and the electrode E 421 by applying an electric charge to the electrode A 411 and capacitive coupling that is formed between the electrode B 412 and the electrode F 422 by applying an electric charge to the electrode B 412. Furthermore, a data signal is transmitted using capacitive coupling that is formed between the electrode C 413 and the electrode G 423 by applying an electric charge to the electrode C 413 and capacitive coupling that is formed between the electrode D 414 and the electrode H 424 by applying an electric charge to the electrode D 414. Additionally, the electrode A 411 and the electrode B 412 are connected, and when an electric charge is applied to the electrode A 411, an electric charge of a sign opposite from that applied to the electrode A 411 is applied to the electrode B 412 at the same time.

Also, the electrode C 413 and the electrode D 414 are connected, and when an electric charge is applied to the electrode C 413, an electric charge of a sign opposite from that applied to the electrode C 413 is applied to the electrode D 414 at the same time. Furthermore, the electrode E 421 and the electrode F 422 are connected, and when an electric charge is applied to the electrode B 421, an electric charge of a sign opposite from that applied to the electrode E 421 is applied to the electrode F 422 at the same time. Furthermore, the electrode G 423 and the electrode H 424 are connected, and when an electric charge is applied to the electrode G 423, an electric charge of a sign opposite from that applied to the electrode G 423 is applied to the electrode H 424 at the same time.

Furthermore, when an electric charge is applied to the electrode A 411, an electric charge of an opposite sign is induced at the electrode E 421 that is arranged facing the electrode A 411. At the same time, an electric charge of a sign opposite from the electric charge applied to the electrode A 411 is applied to the electrode B 412, and an electric charge of a sign opposite from the electric charge applied to the electrode B 412 is induced at the electrode F 422 that is arranged facing the electrode B 412. That is, when a current is applied between the electrode A 411 and the electrode B 412, capacitive coupling is formed between the electrode A 411 and the electrode E 421 and between the electrode B 412 and the electrode F 422, and a current is induced between the electrode E 421 and the electrode F 422. Accordingly, when an AC current is applied between the electrode A 411 and the electrode B 412, an AC current is induced between the electrode E 421 and the electrode F 422, and transmission of power is realized.

Furthermore, when an electric charge is applied to the electrode C 413, an electric charge of an opposite sign is induced at the electrode G 423 that is arranged facing the electrode C 413. At the same time, an electric charge of a sign opposite from the electric charge applied to the electrode C 413 is applied to the electrode D 414, and an electric charge of a sign opposite from the electric charge applied to the electrode D 414 is induced at the electrode H 424 that is arranged facing the electrode D 414. That is, when a current is applied between the electrode C 413 and the electrode D 414, capacitive coupling is formed between the electrode C 413 and the electrode G 423 and between the electrode D 414 and the electrode H 424, and a current is induced between the electrode G 423 and the electrode H 424. Accordingly, by changing, based on encoded data, the amplitude level of the current applied between the electrode C 413 and the electrode D 414, the change is passed on as the change in current between the electrode G 423 and the electrode H 424, and transmission of a data signal is realized.

By applying an AC current to the electrode A 411 and the electrode B 412, power can be transmitted to the electrode B 421 and the electrode F 422 by using capacitive coupling. Furthermore, by controlling the current to be applied to the electrode C 413 and the electrode D 414, a data signal can be transmitted to the side of the electrode G 423 and the electrode H 424 by using capacitive coupling.

[4-2: Functional Configuration Related to Data Transmission and Power Transmission]

Figure 18:
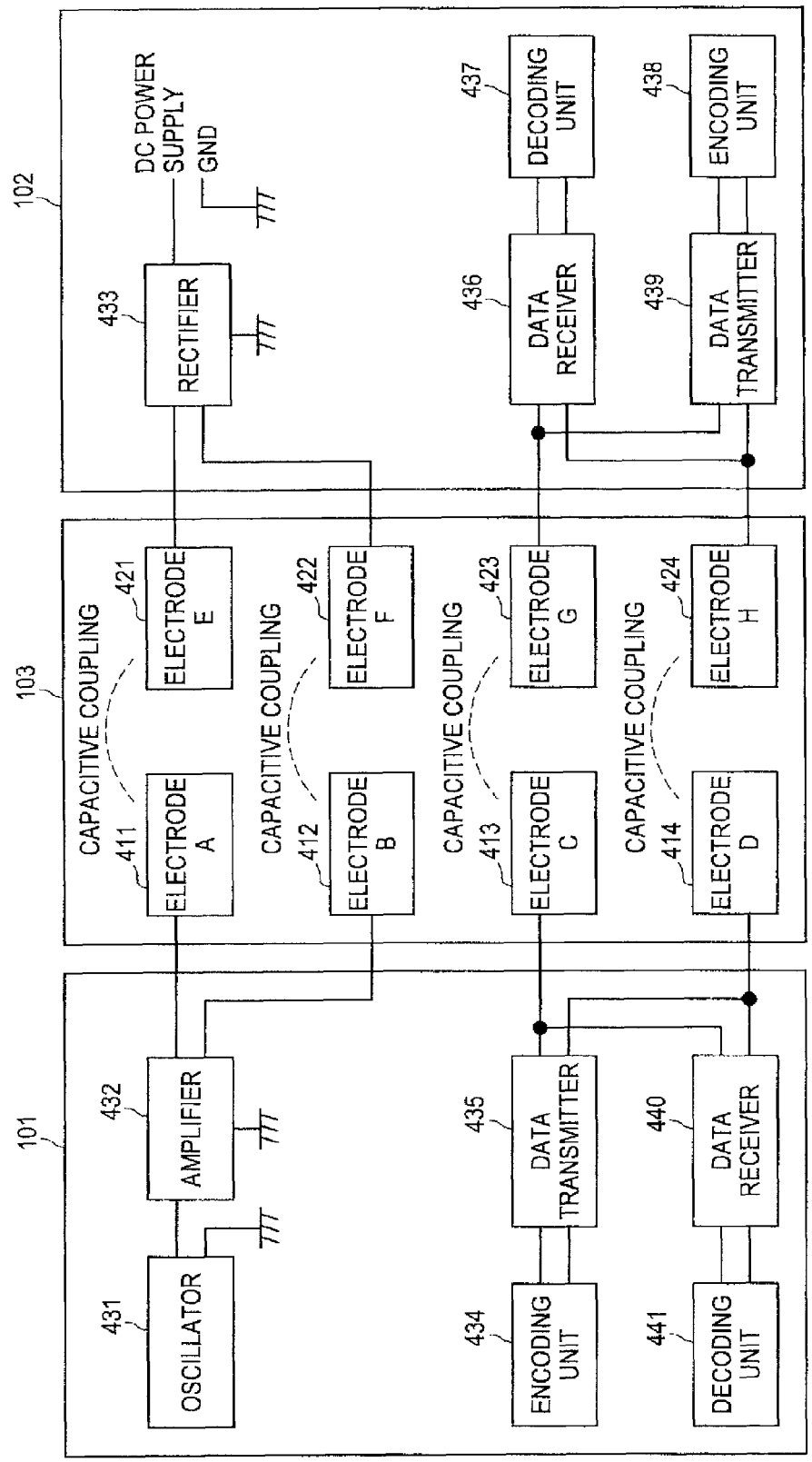
FIG. 18 is an explanatory diagram for describing a functional configuration of the mobile terminal according to the embodiment.

Here, a circuit configuration capable of realizing the data transmission and the power transmission according to the present embodiment will be described with reference to FIG. 18. FIG. 18 is an explanatory diagram for describing a circuit configuration capable of realizing the data transmission and the power transmission according to the present embodiment.
(Power Transmission)

In the example of FIG. 18, the main structural elements related to power transmission are an oscillator 431 and an amplifier 432 provided in the operation unit 101, an electrode A 411, an electrode B 412, an electrode B 421 and an electrode F 422 provided in the hinge 103 (rotating hinges 401, 402), and a rectifier 433 provided in the display unit 102.

First, AC power is output from the oscillator 431 and is input to the amplifier 432. Then, the AC power input to the amplifier 432 is amplified to a predetermined power level by the amplifier 432, and is applied between the electrode A 411 and the electrode B 412. When the AC power is applied between the electrode A 411 and the electrode B 412, capacitive coupling is formed between the electrode A 411 and the electrode E 421 and between the electrode B 412 and the electrode F 422, and a current is induced between the electrode E 421 and the electrode F 422. The current induced between the electrode E 421 and the electrode F 422 is input to the rectifier 433 as AC power. The AC power input to the rectifier 433 is converted from AC to DC by the rectifier 433, and is input to each structural element of the display unit 102 as DC power for driving.
(Data Transmission)

In the example of FIG. 18, the main structural elements related to data transmission are an encoding unit 434, a data transmitter 435, a decoding unit 441 and a data receiver 440 provided in the operation unit 101, an electrode C 413, an electrode D 414, an electrode G 423 and an electrode H 424 provided in the hinge 103 (rotating hinges 401, 402), and a data receiver 436, a decoding unit 437, an encoding unit 438 and a data transmitter 439 provided in the display unit 102.
(Data Transmission from Operation Unit 101 to Display Unit 102)

First, transmission data output from the BBP 123 is input to the encoding unit 434. When the transmission data is input, the encoding unit 434 encodes the transmission data that is input, based on a predetermined encoding scheme, and generates encoded data. As the predetermined encoding scheme, an encoding scheme capable of generating a code not including a DC component, such as an AMI encoding scheme, a partial response encoding scheme, a CMI encoding scheme or the like, is used. In the case of using capacitive coupling, it is not possible to transmit a DC component. Thus, the transmission data is encoded at the encoding unit 434 into encoded data that does not include a DC component such that a DC component is not included in a data signal.

The encoded data generated by the encoding unit 434 is input to the data transmitter 435. When the encoded data is input, the data transmitter 435 applies a current (data signal) of an amplitude level that is based on the encoded data between the electrode C 413 and the electrode D 414. When the current is applied between the electrode C 413 and the electrode D 414, electric charges are applied to the electrode C 413 and the electrode D 414, and electric charges of respectively opposite signs are induced at the electrode G 423 and the electrode H 424 due to capacitive coupling. That is, a current (data signal) is induced between the electrode G 423 and the electrode H 424. A data signal is transmitted using capacitive coupling formed, in this manner, between the electrode C 413 and the electrode G 423 and between the electrode D 414 and the electrode H 424.

The current (data signal) induced between the electrode G 423 and the electrode H 424 is input to the data receiver 436. When this current (data signal) is input, the data receiver 436 determines the amplitude level of the current (data signal) that is input, and restores the original encoded data. The encoded data restored by the data receiver 436 is input to the decoding unit 437. When the encoded data is input, the decoding unit 437 decodes the encoded data that is input, based on the predetermined encoding scheme, and restores the original transmission data. The transmission data restored by the decoding unit 437 is input to a predetermined structural element configuring the display unit 102 (for example, the LCD 124 or the like).

(Data Transmission from Display Unit 102 to Operation Unit 101)

On the other hand, transmission data output from the camera 125, the sensor 126 or the like is input to the encoding unit 438. When the transmission data is input, the encoding unit 438 encodes the transmission data that is input, based on a predetermined encoding scheme, and generates encoded data. Additionally, as the predetermined encoding scheme, an encoding scheme capable of generating a code not including a DC component, such as an AMI encoding scheme, a partial response encoding scheme, a CMI encoding scheme or the like, is used. In the case of using capacitive coupling, it is not possible to transmit a DC component. Thus, the transmission data is encoded at the encoding unit 438 into encoded data that does not include a DC component such that a DC component is not included in a data signal.

The encoded data generated by the encoding unit 438 is input to the data transmitter 439. When the encoded data is input, the data transmitter 439 applies a current (data signal) of an amplitude level that is based on the encoded data between the electrode G 423 and the electrode H 424. When the current is applied between the electrode G 423 and the electrode H 424, electric charges are applied to the electrode G 423 and the electrode H 424, and electric charges of respectively opposite signs are induced at the electrode C 413 and the electrode D 414 due to capacitive coupling. That is, a current (data signal) is induced between the electrode C 413 and the electrode D 414. A data signal is transmitted using capacitive coupling formed, in this manner, between the electrode C 413 and the electrode G 423 and between the electrode D 414 and the electrode H 424.

The current (data signal) induced between the electrode C 413 and the electrode D 414 is input to the data receiver 440. When this current (data signal) is input, the data receiver 440 determines the amplitude level of the current (data signal) that is input, and restores the original encoded data. The encoded data restored by the data receiver 440 is input to the decoding unit 441. When the encoded data is input, the decoding unit 441 decodes the encoded data that is input, based on the predetermined encoding scheme, and restores the original transmission data. The transmission data restored by the decoding unit 441 is input to the BBP 123.

In the foregoing, the mechanisms of the data transmission and the power transmission according to the present embodiment have been described. As described above, the mobile terminal 100 according to the present embodiment transmits power and a data signal by the capacitive coupling scheme. Accordingly, the signal line on the side of the operation unit 101 and the signal line on the side of the display unit 102 do not contact each other in the hinge 103. As a result, transformation of the hinge 103 does not break the signal lines and does not cause poor contact that would result from wear of the contact parts of the signal lines.

5: Fourth Embodiment

Data: Contactless; Power: Contact

Next, a fourth embodiment of the present disclosure will be described. The present embodiment relates to a configuration of contactlessly transmitting a data signal and transmitting power by contact. As has been described, when wear occurs at the contact part of signal lines, there is a risk that a data signal or power may not be transmitted due to poor contact. However, when considering means for transmitting only the power, realization of transmission means by contact having a certain degree of durability is also considered possible.

In the following, a mechanism for transmitting power by contact and contactlessly transmitting a data signal will be described. Additionally, a power line will be a contact-type, and thus unlike the case where it is a contactless type, it will be possible to pass through a DC current. Accordingly, power was transmitted in the case of the contactless type by applying an AC current to a coil or electrode, but in the case of the contact-type, a DC current can be passed through as it is, and thus means for rectifying DC to AC or AC to DC will be unnecessary, for example. As described, the power transmission scheme of the fourth embodiment greatly differs from those of the first to third embodiments (electromagnetic coupling scheme or capacitive coupling scheme) described above.

[5-1: Example Configuration 1]

Figure 19:
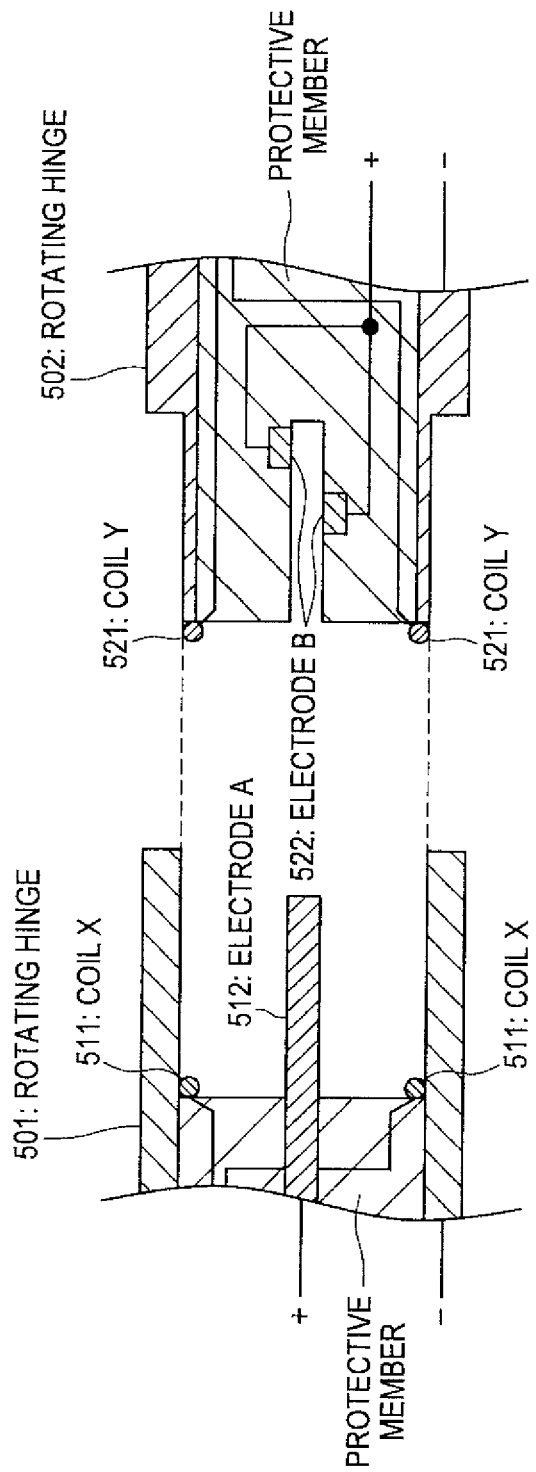
FIG. 19 is an explanatory diagram for describing a configuration (example configuration 1) of a hinge portion of a mobile terminal according to a fourth embodiment of the present disclosure.

As a mechanism for contactlessly transmitting a data signal and transmitting power by contact, structures of rotating hinges 501 and 502 as shown in FIG. 19 are conceivable, for example. Additionally, the rotating hinges 501 and 502 are assumed to be substantially tubular. Furthermore, FIG. 19 is a cross sectional view of the rotating hinges 501 and 502 cut through the rotation axis.

As shown in FIG. 19, the rotating hinge 501 is formed into a concave portion at the connection part to the rotating hinge 502. Furthermore, the rotating hinge 501 is provided with a coil X 511 and a cylindrical electrode A 512. On the other hand, the rotating hinge 502 is formed into a convex shape at the connection part to the rotating hinge 501. Furthermore, the rotating hinge 502 is provided with a coil Y 521 and an electrode B 522. Additionally, it is arranged such that the coil X 511 and the coil Y 521 do not contact each other when the concave portion of the rotating hinge 501 and the convex portion of the rotating hinge 502 are fitted together. On the other hand, it is arranged such that the electrode A 512 and the electrode B 522 contact each other when the concave portion of the rotating hinge 501 and the convex portion of the rotating hinge 502 are fitted together.

A data signal is transmitted using electromagnetic coupling that is formed between the coil X 511 and the coil Y 521. On the other hand, power is transmitted using a power line that is formed by the electrode A 512 and the electrode B 522 being brought into contact with each other. In the example of FIG. 19, a mechanism is provided where the electrode B 522 contacts the side of the electrode A 512 at the time of connection of the rotating hinges 501 and 502. Accordingly, even if the rotating hinge 502 is rotated relative to the rotating hinge 501, the state of contact between the electrode A 512 and the electrode B 522 is maintained. Additionally, there may also be provided pressing means (for example, a spring or the like) for pressing the electrode B 522 radially inwardly so that the electrode B 522 is pressed against the electrode A 512 when the rotating hinges 501 and 502 are connected. By providing this pressing means, poor contact between the electrode A 512 and the electrode B 522 becomes less likely to occur even if the contact parts of the electrode A 512 and the electrode B 522 become worn.

[5-2: Example Configuration 2]

Figure 20:
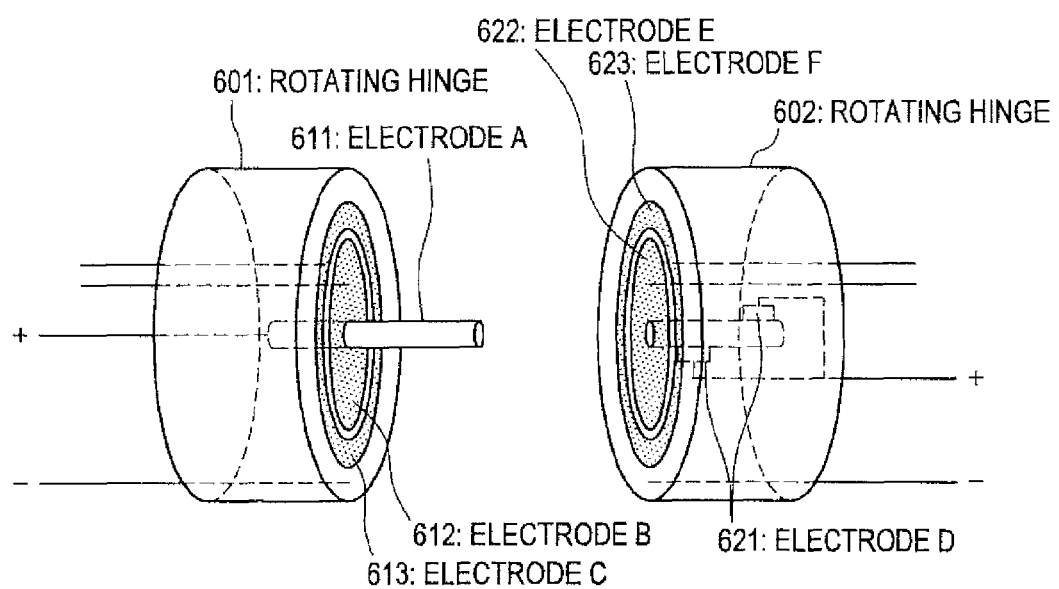
FIG. 20 is an explanatory diagram for describing a configuration (example configuration 2) of the hinge portion of the mobile terminal according to the embodiment.

The example configuration 1 described above used the electromagnetic coupling scheme for contactless transmission for transmitting a data signal, but the capacitive coupling scheme can also be used for the contactless transmission. For example, as shown in FIG. 20, an electrode A 611 and an electrode D 621 for transmitting power are structured such that they will contact each other when rotating hinges 601 and 602 are connected. On the other hand, an electrode B 612 and an electrode E 622, and an electrode C 613 and an electrode F 623 are structured such that they will be arranged facing each other when the rotating hinges 601 and 602 are connected.

Additionally, the electrode B 612 and the electrode E 622, and the electrode C 613 and the electrode F 623 are formed such that they do not contact each other when the rotating hinges 601 and 602 are connected. For example, protective coatings are applied on the surfaces of the electrode B 612, the electrode C 613, the electrode E 622 and the electrode F 623, or each of these electrodes are arranged within the respective rotating hinges 601 and 602. Transmission of a data signal is performed by the already described capacitive coupling scheme. For example, when a current is applied between the electrode A 611 and the electrode B 612, a current is induced between the electrode E 622 and the electrode F 623, and, therefore, by controlling the current, a data signal is transmitted.

As described, with the mechanism that allows transmission of power by contact, power can be transmitted as it is as a direct current. As a result, a loss occurring at the time of converting the power from DC to AC or from AC to DC can be avoided. Furthermore, it becomes unnecessary to provide a rectifier or the like, and the circuit scale can be reduced to that extent.

6: Summary

Lastly, the technical contents according to the embodiment of the present disclosure will be briefly described. The technical contents stated here can be used as data transmission means and power transmission means of various electronic appliances such as a personal computer, a mobile phone, a portable game machine, a portable information terminal, an information appliance and a car navigation system, for example.

For example, a configuration of an electronic appliance capable of realising the data transmission method and the power transmission method of the present embodiment can be expressed as below. This electronic appliance includes a first rotating hinge including a first electrode and a first coil, and a second rotating hinge including a second electrode and a second coil. The first electrode is means for transmitting a direct current. Also, the first coil is for transmitting/receiving a data signal by using electromagnetic induction. The second electrode is means for receiving the direct current by contacting the first electrode. Also, the second coil is means for transmitting/receiving the data signal to/from the first coil.

Additionally, the first and second rotating hinges form the hinge portion. This hinge portion connects the first rotating hinge and the second rotating hinge in a rotatable manner while maintaining a state where the first electrode and the second electrode are in contact with each other and a centre axis of the first coil and a centre axis of the second coil are substantially same. In this manner, by contactlessly transmitting a data signal by the electromagnetic induction using coils, even if the first and second rotating hinges are rotated around the same axis while being joined, a data signal can be transmitted without being affected by the rotation. Also, even if the part where the first and second rotating hinges make contact wears out, no trouble due to poor contact will be caused in data transmission. Furthermore, by making the first and second electrodes contact type, a DC current can be transmitted as it is.

(Notes)

The rotating hinge 501 is an example of a first rotating hinge. The electrode A 512 is an example of a first electrode. The coil X 511 is an example of a first coil. The rotating hinge 502 is an example of a second rotating hinge. The electrode B 522 is an example of a second electrode. The coil Y 521 is an example of a second coil. The hinge 103 is an example of a hinge portion.

The rotating hinge 301 is an example of a first rotating hinge. The coil X 311 is an example of a first coil. The electrode A 312 and the electrode B 313 are examples of a first electrode. The rotating hinge 302 is an example of a second rotating hinge. The coil Y 321 is an example of a second coil. The electrode C 322 and the electrode D 323 are examples of a second electrode. The hinge 103 is an example of a hinge portion.

The rotating hinge 202 is an example of a first rotating hinge. The coil C 221 is an example of a first coil. The coil D 222 is an example of a second coil. The rotating hinge 201 is an example of a second rotating hinge. The coil A 211 is an example of a third coil. The coil B 212 is an example of a fourth coil. The hinge 103 is an example of a hinge portion.

The rotating hinge 401 is an example of a first rotating hinge. The electrode A 411 and the electrode B 412 are examples of a first electrode. The electrode C 413 and the electrode D 414 are examples of a second electrode. The rotating hinge 402 is an example of a second rotating hinge. The electrode D 421 and the electrode F 422 are examples of a third electrode. The electrode G 423 and the electrode H 424 are examples of a fourth electrode. The hinge 103 is an example of a hinge portion.

It should be understood by those skilled in the art that various modifications, combinations, sub-combinations and alterations may occur depending on design requirements and other factors insofar as they are within the scope of the appended claims or the equivalents thereof.

For example, in the above explanation, structures of the rotating hinges 201, 202, 301, 302, 401, 402, 501, 502, 601 and 602 are shown. Which rotating hinge is to be formed on the side of the operation unit 101 and which is to be formed on the side of the display unit 102 can be changed as appropriate. Furthermore, in the above, an explanation has been given on a structure of fitting together cylindrical or tubular rotating hinges or of arranging cylindrical rotating hinges in a manner facing each other, but the shape of the rotating hinges is not limited to a tube or a cylinder. However, since a structure rotatable around a rotation axis is assumed, the structure of a convex portion or a concave portion of a rotating hinge is preferably tubular or cylindrical.

Furthermore, in the case of transmitting both data signal and power by the capacitive coupling scheme, an electrode for transmitting the data signal and an electrode for transmitting the power can be arbitrarily selected. Similarly, in the case of transmitting both data signal and power by the electromagnetic coupling scheme, a coil for transmitting the data signal and a coil for transmitting the power can be arbitrarily selected. Furthermore, refinements such as making a configurational change or applying protective coatings so that coils or electrodes do not contact each other can be made as necessary.

What is claimed is:

1. An electronic appliance comprising:
a hinge portion including
a first rotating hinge including
a first electrode for transmitting a direct current, and
a first coil for transmitting/receiving a data signal by using electromagnetic induction; and
a second rotating hinge including
a second electrode for receiving the direct current by contacting the first electrode, and
a second coil for transmitting/receiving the data signal to/from the first coil,
wherein the hinge portion connects the first rotating hinge and the second rotating hinge in a rotatable manner while maintaining a state where the first electrode and the second electrode are in contact with each other and a centre axis of the first coil and a centre axis of the second coil are substantially same.

2. The electronic appliance according to claim 1,
wherein the first rotating hinge includes a cylindrical convex portion,
wherein the second rotating hinge includes a tubular concave portion to which the cylindrical convex portion of the first rotating hinge is fitted,
wherein the convex portion of the first rotating hinge has a centre axis that is substantially same as with the concave portion of the second rotating hinge, and
wherein the first rotating hinge has a structure capable of rotating with a centre axis of the convex portion of the first rotating hinge as a rotation axis in a state where the convex portion of the first rotating hinge and the concave portion of the second rotating hinge are fitted together.

3. An electronic appliance comprising:
a hinge portion including
a first rotating hinge including
a first coil for transmitting power by using electromagnetic induction, and
a first electrode for transmitting/receiving a data signal by using capacitive coupling, and
a second rotating hinge including
a second coil for receiving the power transmitted from the first coil, and
a second electrode for transmitting/receiving the data signal to/from the first electrode,
wherein the hinge portion connects the first rotating hinge and the second rotating hinge in a rotatable manner while maintaining a state where a centre axis of the first coil and a centre axis of the second coil are substantially same and the first electrode and the second electrode are substantially parallelly separated at a predetermined distance.

4. An electronic appliance comprising:
a hinge portion including
a first rotating hinge including
a first coil for transmitting power by using electromagnetic induction, and
a second coil for transmitting/receiving a data signal by using electromagnetic induction, and
a second rotating hinge including
a third coil for receiving the power transmitted from the first coil, and
a fourth coil for transmitting/receiving the data signal to/from the second coil,
wherein the hinge portion connects the first rotating hinge and the second rotating hinge in a rotatable manner while maintaining a state where a centre axis of the first coil and a centre axis of the third coil are substantially same and a centre axis of the second coil and a centre axis of the fourth coil are substantially same.

5. The electronic appliance according to claim 4,
wherein a first frequency of AC current applied to the first and third coils is lower than a second frequency of AC current applied to the second and fourth coils.

6. An electronic appliance comprising:
a hinge portion including
a first rotating hinge including
a first electrode for transmitting power by using capacitive coupling, and
a second electrode for transmitting/receiving a data signal by using capacitive coupling, and
a second rotating hinge including
a third electrode for receiving the power transmitted from the first electrode, and
a fourth electrode for transmitting/receiving the data signal to/from the second electrode, and
wherein the hinge portion connects the first rotating hinge and the second rotating hinge in a rotatable manner while maintaining the first electrode and the third electrode substantially parallelly separated at a predetermined distance and the second electrode and the fourth electrode substantially parallelly separated at a predetermined distance.

* * * * *